(12) United States Patent
Hauschild et al.

(10) Patent No.: US 12,719,042 B2
(45) Date of Patent: Aug. 25, 2026

(54) MASS SPECTROMETRY SYSTEM FOR DETERMINING A MEASURE OF A RATE OF DECAY

(71) Applicant: Thermo Fisher Scientific (Bremen) GmbH, Bremen (DE)

(72) Inventors: Jan-Peter Hauschild, Bremen (DE); Tobias Woerner, Bremen (DE); Kyle Fort, Bremen (DE); Alexander Makarov, Bremen (DE); Konstantin Aizikov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 306 days.

(21) Appl. No.: 18/641,183

(22) Filed: Apr. 19, 2024

(65) Prior Publication Data

US 2024/0355608 A1 Oct. 24, 2024

(30) Foreign Application Priority Data

Apr. 20, 2023 (DE) ............................ 202023102071

(51) Int. Cl.
*H01J 49/24* (2006.01)
*G01N 30/72* (2006.01)
(Continued)

(52) U.S. Cl.
CPC .............. *H01J 49/24* (2013.01); *G01N 30/72* (2013.01); *H01J 49/0009* (2013.01); *H01J 49/26* (2013.01)

(58) Field of Classification Search
CPC ........ H01J 49/24; H01J 49/0009; H01J 49/26; G01N 30/72
See application file for complete search history.

(56) References Cited

U.S. PATENT DOCUMENTS 7,714,283 B2 5/2010 Makarov et al.
9,460,905 B2 10/2016 Aizikov et al.
(Continued)

FOREIGN PATENT DOCUMENTS

WO 2018134346 A1 7/2018

OTHER PUBLICATIONS

Parisod et al., "Determination of ion-molecule collision frequencies by Fourier transform ion cyclotron resonance spectroscopy," Chem. Phys. Lett., 62(2): 303-305 (1979).
(Continued)

*Primary Examiner* — Nicole M Ippolito
(74) *Attorney, Agent, or Firm* — Klarquist Sparkman, LLP

(57) ABSTRACT

Mass spectrometry systems for performing mass analysis on ion samples include a vacuum region comprising a mass analyser configured to provide a detection signal for the ion sample. A turbomolecular pump is configured to maintain the vacuum region at a vacuum pressure and a controller is configured to control the pressure within the mass analyser to control the rate of decay over time of the detection signal for the ion sample by: controlling a pumping speed of the turbomolecular pump. The turbomolecular pump can be configured to maintain the vacuum region at a first pressure when the mass analyser is being operated in a mass analysis mode of operation and a second pressure when the mass analyser is being operated in a collision cross section analysis mode of operation, wherein the second pressure is greater than the first pressure.

35 Claims, 8 Drawing Sheets

(51) Int. Cl.
*H01J 49/00* (2006.01)
*H01J 49/26* (2006.01)

(56) References Cited

U.S. PATENT DOCUMENTS

| | | | | |
|---|---|---|---|---|
| 10,224,193 | B2 | 3/2019 | Makarov et al. | |
| 10,593,530 | B2 | 3/2020 | Thoeing et al. | |
| 2013/0181125 | A1* | 7/2013 | Guna .................. | H01J 49/0031 250/281 |

OTHER PUBLICATIONS

Guan et al., "Effect of ion-neutral collision mechanism on the trapped-ion equation of motion: a new mass spectral line shape for high-mass trapped ions," Int. J. of Mass Spectrometry and Ion Processes, 167, pp. 185-193 (1997).
Yang et al., "Collision cross sectional areas from analysis of Fourier transform ion cyclotron resonance line width: a new method for characterizing molecular structure," Anal. Chem., 84(11): 4851-4857 (2012).
Jiang et al., "Extracting biomolecule collision cross sections from the high-resolution FT-ICR mass spectral linewidths," Phys. Chem. Chem. Phys., 18.2: 713-717 (2016).
Sanders et al., "Determination of collision cross-sections of protein ions in an orbitrap mass analyzer," Anal. Chem., 90 (9): 5896-5902 (2018).
Guo et al., "Collision cross section measurements for biomolecules within a high-resolution FT-ICR cell: theory," Phys. Chem. Chem. Phys., 17(14): 9060-9067 (2015).
Wobschall et al., "Ion cyclotron resonance and the determination of collision cross sections," Phys. Rev., 131(4): 1565 (1963).
Wobschall et al., "Collision cross sections of hydrogen and other ions as determined by ion cyclotron resonance," Journal of Chemical Physics, 47(10): 4091-4094 (1967).
Eiler et al., "Analysis of molecular isotopic structures at high precision and accuracy by Orbitrap mass spectrometry," Int. J. of Mass Spectrometry, 422: 126-142 (2017).
Li et al., "Ion collision cross section measurements in Fourier transform-based mass analyzers," Analyst, 141(12): 3554-3561 (2016).
Lyutvinskiy et al., "Adding colour to mass spectra: Charge Determination Analysis (CHARDA) assigns charge state to every ion peak," ChemRxiv Cambridge: Cambridge Open Engage, 21 pp., (2021).

* cited by examiner

Resolution
(I)
63k
(II)
54k
Peak Intensity (AU)

(I)
~63k
(II)
~54k
$\log_{10}$SNR

MASS SPECTROMETRY SYSTEM FOR DETERMINING A MEASURE OF A RATE OF DECAY

CROSS REFERENCE TO RELATED APPLICATIONS

This application claims priority from application DE 202023102071.2, filed Apr. 20, 2023. The entire disclosure of application DE 202023102071.2 is incorporated herein by reference.

FIELD

The present disclosure relates to mass spectrometry systems for determining a measure of a rate of decay.

BACKGROUND

Measurements of collision cross-section (CCS) areas can provide valuable information about the structures of molecules, such as proteins and protein complexes, for example. it is known that in Fourier transform ion cyclotron resonance (FTICR) mass spectrometry, ion-molecule collision frequencies are related to signal transient decay rates and could be measured by analysis of those rates (Parisod, G.; Comisarow, M. B. Chem. Phys. Lett. 1979, 62, 303-305; Guan, S.; Li, G.-Z.; Marshall, A. G. Int. J. Mass Spectrom. Ion Processes 1997, 167, 185-193). Measurement of signal decay rates from peak widths can yield collision frequencies and thus collision CCS.

This effect was recently increasingly employed for measurement of CCS of both small molecules (Yang et al., "Collision Cross Sectional Areas from Analysis of Fourier Transform Ion Cyclotron Resonance Line Width: A New Method for Characterizing Molecular Structure", Anal. Chem. 2012, 84, 4851-4857) under the name CRAFTI (CRoss sectional Areas by FT ICR), as well as proteins (Marshall et al., Phys. Chem. Chem. Phys., 2016, 18, 713-717). It was also used in orbital trapping (e.g. the Orbitrap™ analyser, manufactured by Thermo Fisher Scientific) mass spectrometry (Sanders J D et al. Anal. Chem., 2018; 90(9):5896-902). Following Guo et al. (Phys. Chem. Chem. Phys., 2015, 17, 9060), it could be deduced that signal decay in the Orbitrap analyser is described by an energetic hard-sphere collision model, in which every collision results in fragmentation of an ion and its removal from the detected ion packet.

In Fourier transform mass spectrometry (FTMS), the time-domain transient would theoretically be approximately sinusoidal if not for collisions, but is actually more complex. Time-domain signals in FTMS typically approximate a sinusoidal wave with an exponentially decaying amplitude, with the decay being attributed primarily to collisions with the background gas. The decay constant is therefore linked to the CCS, since ions with higher CCS are expected to collide with background gas more frequently and hence the image signals provided by such ions are expected to decay more rapidly. Generally, considering two ions with the same mass-to-charge ratio (m/z), the ion with the larger mass (and thus higher charge) would tend to have a greater CCS, because it would be expected to be physically larger in order to have such a large mass, and thus would be expected to decay more frequently.

Wobschall et al. (Phys. Rev. 131, 1565 (1963)) describe that the ion cyclotron resonance absorption line in weakly ionised gases may be interpreted to obtain mass-to-charge ratio and the number, and the collision frequency of the ions. From observed linewidths, the collision frequencies of several ions are found as a function of pressure and electric field strength. These data are used to determine the ion-molecule collision cross section. Wobschall et al. (J. Chem. Phys. 47, 4091 (1967)) describe the determination of CCS of Hydrogen and other ions using ion cyclotron resonance, through determinations of the widths of ion cyclotron resonance lines as a function of pressure and electric field strengths.

In all FTMS instruments, collision cross sections are measured relative to a known ion, e.g. a calibrant ion. However, these measurements demonstrate significant deviations in decay time between isolated ion populations (e.g. a particular charge state of a protein) and wide mass range populations. Moreover, there has been no demonstration of a method on a time scale compatible with separation techniques like liquid chromatography (LC) or gas chromatography (GC).

Existing methods usually rely on isolation of particular ions of interest to get sufficiently high intensity for reliable peak width, and thus decay rate, determination. Therefore, they do not allow online determination of CCS over wide mass ranges and do not allow parallel determination of CCS along with m/z.

SUMMARY

Against this background and in accordance with a first aspect, there is provided a mass spectrometry system according to claim 1. In accordance with a second aspect, there is provided a mass spectrometry system according to claim 7. In accordance with a third aspect, there is provided a mass spectrometry system according to claim 8.

The present disclosure provides apparatus for determining decay constants and cross-section measurements in parallel to mass measurement and decay time correction. The disclosure particularly relates to apparatus for performing Fourier transform mass spectrometry (FTMS). The disclosure recognises that existing methods of determining CCS typically rely on isolating particular ions for analysis to get high enough intensities for reliable peak width determination. The disclosure recognises that lower intensities lead to greater defocusing effects (due to space charge, for example) and so less reliable signal decay/CCS measurements. Therefore, this does not practically allow for determination of decay constant/CCS from analysis of lower ion intensities, such as encountered over a wide mass range of ions, and hence does not allow practical or routine CCS determination in parallel with conventional m/z determination.

To address the limitations of the existing solutions as outlined above, embodiments of the disclosure use a measure of signal intensity, such as signal-to-noise ratio (SNR), for intensity-dependent (e.g. SNR- and/or m/z-dependent) corrections of decay times, which correspond to the CCS. In some embodiments, measurements of signal resolution are extrapolated from low SNR values, where measurements are likely to be inaccurate, to equivalent resolutions at higher SNR where self-bunching of ions (which leads to reduced de-phasing) can be exploited to improve measurement certainty. In some embodiments, the ion sample is generated following a separation technique, for instance liquid chromatography (LC) or gas chromatography (GC), from which it has an elution profile over time. The disclosure also recognises that recording peak widths of each analyte over the entire elution profile can provide more information about decay constant and CCS, and can be used to improve the statistics of CCS measurements. For instance, tracking peak widths of each analyte across the entire elution profile can decrease the error of CCS determination after corrections are applied.

In some embodiments, corrections are made for the signal-to-noise-ratio (SNR) of mass peaks (which depends on the number of ions (intensity) corresponding to the peak) in order to improve the accuracy of measured signal decay times and hence CCS determinations. The disclosure further provides corrections for m/z dependency. The system thus uses previously determined dependencies of the decay constants on the characteristics (e.g. ion intensity (SNR), m/z) for the calibration. Embodiments of the present disclosure therefore allow for extraction of CCS values directly from high-resolution accurate-mass spectra of a wide mass range of ions, preferably 'Full-MS' spectra. Such methods are fully compatible with high-dynamic range scan methods.

In some embodiments, peak widths can be tracked for each analyte over the entre elution profile of the analyte and the final decay constant for the analyte of interest can be calculated as a weighted average of all points across retention time, with lower-intensity components receiving significantly lower weights than high-intensity ones. The decay constant can also be determined in this weighted manner from all identified isotopes/charge states of the analyte.

The disclosure also provides improved hardware for performing such methods. Decay constants depend on gas pressure in the mass analyser. An improved means of varying gas pressure is provided in the form of controlling the pumping speed (i.e. rotational speed) of a turbomolecular pump that is configured to pump a vacuum region of a mass spectrometer in which the mass analyser is situated.

Thus, the disclosure generally provides systems for performing mass spectrometry in which the decay constant, m/z and calibration are performed on-line. Such systems may be configured to create a flow of ions, for example a flow of ions generated from an ion source, and inject a set of ions from this flow into a trapping ion-optical device, such as mass analyser, where ions perform periodic motion confined by electromagnetic fields. Image current is detected of the ions' periodic motion for a period of time over which at least a part of ions experience collisions with gas molecules in the trap. Characteristics of the ions' periodic motion, such as one or more of intensities, phases, frequencies (i.e. m/z), decay constants, may be determined for multiple ion species simultaneously within the set of ions. Values of decay constants or CCS for each species can be determined based on previously-calibrated dependences on the ions' characteristics. The previously-calibrated dependencies can include any one or more of: an intensity of an ion species of interest; an intensity and/or frequency of an ion species of interest; and/or an intensity and/or frequency distributions of all ion species including the ion species of interest. Compared to existing methods, improved dynamic range, accuracy and precision of CCS measurement can be attained and signal decay can be used for quality control of detected mass peaks.

These and other advantages will become apparent from the following description of preferred embodiments.

LISTING OF FIGURES

The present disclosure will now be described by way of example, with reference to the accompanying figures, in which.

DETAILED DESCRIPTION

Figure 1A:
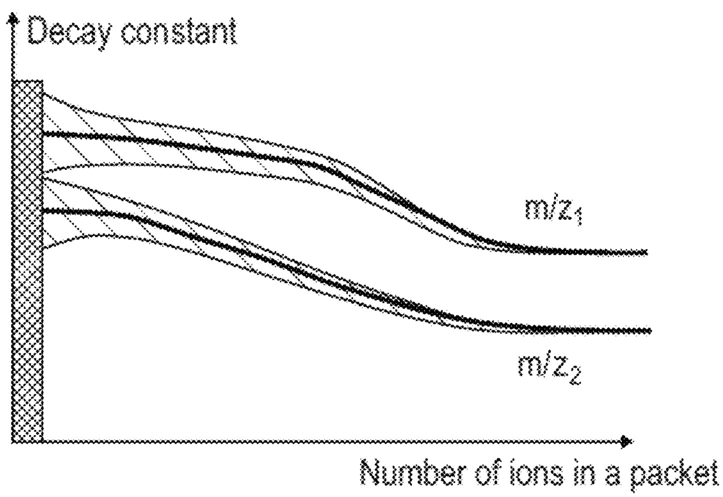
FIGS. 1A and 1B shows the relationship between decay constant, number of ions in a packet and elution time.

Based on theoretical and experimental examination of signal decay in FTMS (and especially Orbitrap MS), it has been recognised that ions experience a number of space charge related effects. The most striking seems to be so-called "self-bunching" wherein "natural" broadening of an ion packet is suppressed at high ion populations due to the combined action of space charge and electric field non-linearity, as described in U.S. Pat. No. 7,714,283. By manufacturing an Orbitrap analyser with high accuracy and by optimising its tuning, these effect can in many cases be made negligible or at least reduced to a tolerable level. However, space charge effects (e.g. self-bunching) can still be noticeable when CCS is calculated from decay constants, as illustrated by FIG. 1A. In FTMS, decay constants can be determined from widths of mass peaks in mass spectra obtained from transients, for example using Fourier transform with apodisation and zero-filling as known in the art. General equations for determining decay constants from Fourier transform mass spectral data are presented in the "Theory and methods" section of Marshall et al., Phys. Chem. Chem. Phys., 2016, 18, 713. Similarly, methods from Sanders J D et al. Anal. Chem., 2018; 90(9):5896-902 can also be used. Errors of CCS determination depend on parameters of detected mass peaks, primarily SNR, with lower intensity peaks experiencing stronger space charge and other defocusing effects.

Although the actual number of ions in a packet is difficult to establish, it is proportional to SNR of a peak at a given transient duration and decay constant, with the coefficient of proportionality dependent only on thermal noise of the preamplifier of the detector and its frequency dependence. The relationship between SNR and ion number is described in, for example, section 2.1 of Eiler et al. (Analysis of molecular isotopic structures at high precision and accuracy by Orbitrap mass spectrometry (International Journal of Mass Spectrometry, Volume 422, 2017, Pages 126-142, ISSN 1387-3806), which is incorporated herein by reference. The relationships for determining ion number described in Eiler et al. can be used in embodiments of the present disclosure whenever signal intensities or SNR are described as being used.

FIG. 1A illustrates the dependencies of decay constant on the number of ions in a packet for different m/z ratios. The error band caused by statistics and underlying thermal noise of a preamplifier is shown as greyed bands. The hashed band to the left hand side of FIG. 1A illustrates the lower limit of detection. It can be seen that at low ion numbers, measurements of decay constants (and hence collision cross section) are systematically higher than measurement of the same sample when packets with higher numbers of ions are analysed. It is sometimes desirable to measure collision cross section to characterise a molecule, since it is an inherent property of a molecule. Therefore, the present disclosure seeks to provide accurate measurements of decay constants and/or collision cross sections that take into account the variations shown in FIG. 1A.

The dependences of FIG. 1A may be obtained first using a calibration mixture of compounds (also described as a calibrant) and then refined for a particular sample or experiments. While decay constants are strongly dependent on m/z and/or charge state, the shape of the curves in FIG. 1A depends mainly on the number of ions in a packet, and to a lesser extent on m/z. However, second-order effects can also occur, especially if very intense peaks appear near the ions of interest. The FT data processing method (e.g. magnitude, absorption, enhanced FT (eFT), etc.) can also influence determined values, because each method might exhibit its own dependence of peak width on decay constant and intensity. However, such dependences are not necessarily problematic, if the same FT processing method is used for calibration and subsequent analysis. As long as the same method is used for the calibrant and the sample, with appropriate statistics, any FT method can be used.

Figure 1B:
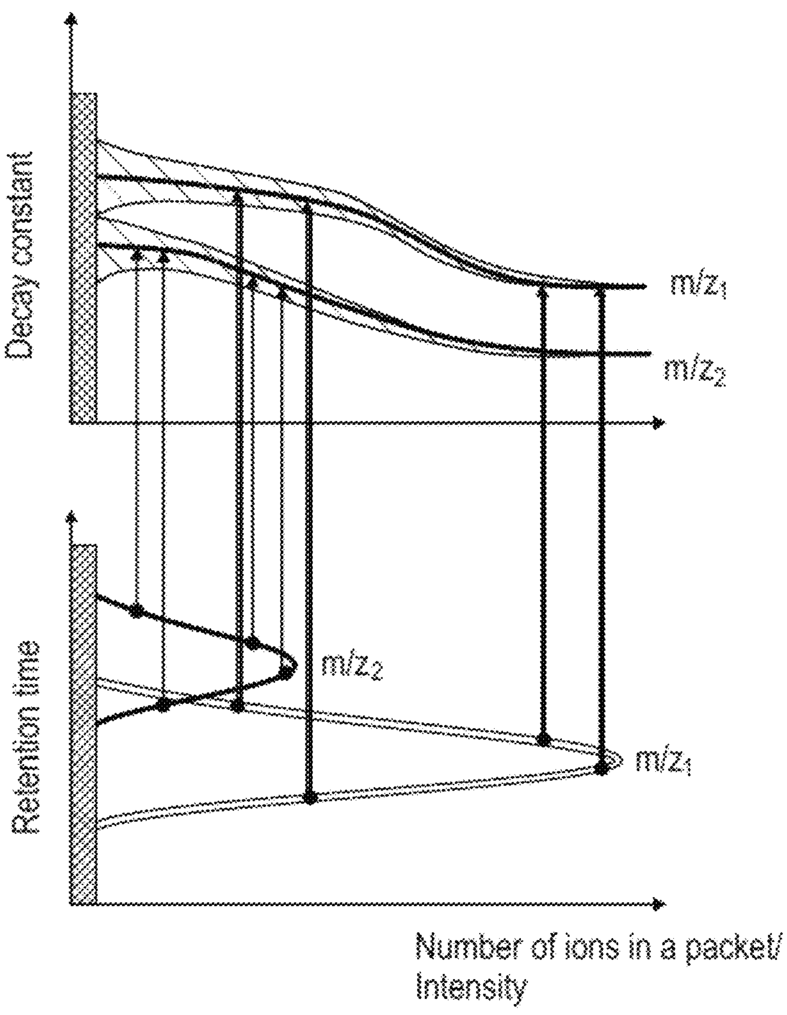

The dependencies of FIG. 1A may be used for post-acquisition correction of decay constant measurements across an elution profile of each mass peak and charge state, as shown in FIG. 1B, for each isotope of analyte of interest. The black circles in FIG. 1B indicate time points at which measurements are taken across elution profile of mass peaks. It can be seen that these time points on the elution profile correspond to different decay constants. Assignment of isotopes and charge states could be done using algorithms similar to the one described in U.S. Pat. No. 10,593,530, which is incorporated herein by reference. The final decay constant for the analyte of interest may be calculated as a weighted average of all points across retention time and/or for all isotopes, with lower-intensity components receiving higher corrections as well as significantly lower weights than high-intensity components. It might be preferable to include not all isotopic peaks, but only the most intense ones, e.g. exceeding 30% or 50% of the most intense peak in a cluster. It may also be possible only to use points that have greater than a certain percentage (e.g. 10%, 20%, 30%, 40% etc.) of the peak intensity. In any event, FIG. 1B shows that corrections can be made to measured decay times for a given time point on an elution profile for each m/z ratio.

For instance, considering the first elution peak for $m/z_1$, the first measurement of decay constant (i.e. the lowermost black circle in FIG. 1B) will be obtained while the number of ions in the packet is relatively low. This leads to the decay constant being measured from the left hand side of the graph of FIG. 1A, and thus leads to the measurement having a large error. As time progresses, the next two black circles (i.e. the second and third lowermost black circles in FIG. 1B) show that measurements of decay constant are taken for a relatively large number of ions in the packet, meaning that the decay constant is measured from the right hand side of the graph of FIG. 1A, and thus leads to the measurement having a relatively small error. Then, the fourth lowermost black circle is from the trailing edge of the retention peak and again leads to a measure of the decay constant from the left hand side of FIG. 1A. A similar pattern repeats for the elution of $m/z_2$. Thus, different measurements taken at different points in an elution profile can be corrected, and/or they can be weighted when determining an average decay constant for a given sample. Preferably, different measurements taken at different points in an elution profile are corrected and weighted: first, data are corrected using the data from calibrant measurements, and then a weighted average is obtained for better statistics.

Corrections can be made to measured decay constants or CCS values based on m/z. As can be seen in FIG. 1B, different m/z values have different profiles of decay constant against ion count. Corrections based on m/z may be implicit, since m/z affects decay rate in an indirect way: higher m/z values tend to have higher CCS for a given charge state. In addition, for a given transient length, resolution is lower for higher m/z due to the lower frequency oscillations. Thus, when correcting measures of the rate of decay (e.g. decay constant or CCS) of an ion sample by adjusting for a measure of intensity (e.g. SNR), these two m/z-dependent effects get convoluted. In principle, more elaborate corrections could be developed using machine learning based on big data collected on large datasets. These datasets could cover specific chemical classes, such as tryptic peptides, lipids, glycans, etc. and/or utilize similarity of mass spectra.

It is clear from FIG. 1B that the error in decay constant, and hence CCS error, of peak $m/z_2$ will be significantly greater than that for $m/z_1$, due to there being much greater errors in decay constant determination for lower intensities. To improve SNR and hence reduce CCS error, high-dynamic range scans are preferably used as disclosed in U.S. Pat. No. 10,224,193-B2 and WO-2018-134,346-A1, both of which are incorporated herein by reference in their entirety.

FIGS. 1A and 1B illustrate that there is a limit to the resolution in FTMS signals imposed solely by the vacuum conditions in the detector for an ionic species. As the number of oscillating ions in a given packet increases, essentially all space/image-charge related pathways of signal coherence loss tend to shrink, which cases the observed resolution to gradually increase up to a certain point (known as self-bunching). Above this point, detection signals for ion samples typically show a pattern of exponential decay dominated by collisional effects. Above this point, the only mechanism of decay is through the ion collisions with a background gas molecules. This is shown by the plateau on the right hand side in FIG. 1A and on the right hand side of the upper panel of FIG. 1B. Some embodiments of the present disclosure seek to ensure that the resolution values that are used for decay constant or CCS determination come from those 'plateau' regions.

Figure 2A:
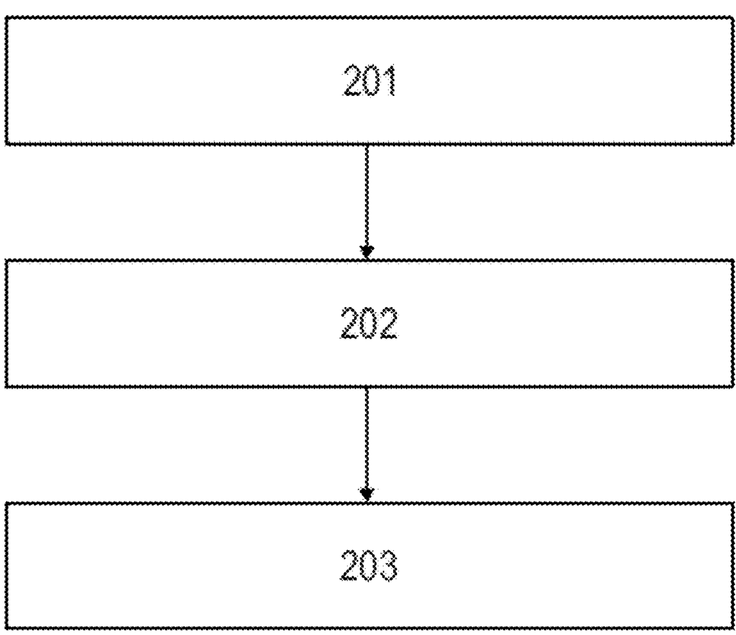
FIG. 2A shows a method for determining a measure of a rate of decay of an ion sample performed by a mass spectrometry system according to a first embodiment.

FIG. 2A shows a method, described in generalised language, for determining a measure of a rate of decay of an ion sample undergoing mass analysis in a mass analyser configured according to a first embodiment of the present disclosure. The method may be for determining a corrected measure of a rate of decay of an ion sample using the data shown in FIGS. 1A and 1B. The method comprises a first step 201 of receiving a detection signal for the ion sample from a transient detection of the ion sample obtained using the mass analyser, the detection signal for the ion sample having a rate of decay over time. Such a detection signal may be an image current detected by the mass analyser. In a second step 202, the method comprises determining an adjustment function for the ion sample, based on (e.g. that includes dependence on): a measure of intensity (e.g. SNR, or total ion count) and/or a measure of mass-to-charge ratio (e.g. frequency) of the detection signal for the ion sample; and a measure of intensity (e.g. SNR, or total ion count) and/or a measure of mass-to-charge ratio (e.g. frequency) of a detection signal previously obtained for a calibrant using the mass analyser. The method comprises a third step 203 of determining the measure of the rate of decay of the ion sample, by adjusting a measure of the rate of decay over time of the detection signal for the ion sample using the adjustment function. In this way, an accurate measure of the rate of decay of the ion sample can be obtained, because the intensity and/or mass-to-charge ratio of a signal from a calibrant (e.g. having a decay constant and/or cross section that is known accurately) are used to determine an adjustment function which is used to adjust the values measured for the ion sample. Thus, the dependence of decay constant or CCS shown in FIGS. 1A and 1B can be accounted for.

In an alternative aspect, a weighted average may be calculated. For example, there may be provided a method for determining a weighted measure of a rate of decay of an ion sample undergoing mass analysis in a mass analyser, the method comprising: receiving a plurality of detection signals for the ion sample from a transient detection of the ion sample obtained using the mass analyser, the detection signals for the ion sample having rates of decay over time; determining a plurality of measures of the rate of decay of the ion sample; determining the weighted measure of the rate of decay (and optionally correcting those measures of the rate of decay) of the ion sample by taking a weighted average of the plurality of measures of the rate of decay of the ion sample, wherein relatively high measures of intensity of the detection signal for the ion sample are weighted to provide a greater contribution to the weighted average than relatively low measures of intensity of the detection signal for the ion sample. The plurality of detection signals for the ion sample may be obtained at a plurality of time points across the elution profile of the ion sample. This is similar to the process shown in FIG. 2A and the various steps described in this disclosure may apply equally to this alternative aspect. However, this aspect recognises that by taking a weighted average of the plurality of measures of the rate of decay of the ion sample, more accurate measurements can be made. The weighted averaging may completely exclude certain measures of the rate of decay (e.g. because they have extremely poor resolution) and so it might not be necessary to correct those values when calculating the weighted average (because their contribution would be zero).

The methods of the present disclosure may comprise determining a weighted measure of the rate of decay of the ion sample by taking a weighted average of the plurality of measures of the rate of decay of the ion sample. For instance, wherever a measure of the rate of decay of the ion sample is described, this may be a weighted measure. This can ensure that measures of the rate of decay of the ion sample that are statistically likely to be accurate are prioritised, thereby improving the accuracy with which decay constants and CCS can be determined.

In such methods, the plurality of measures of the rate of decay of the ion sample may correspond to one or more relatively high measures of intensity of the detection signal for the ion sample (e.g. values to the right hand side of FIGS. 1A and 1B) and one or more relatively low measures of intensity of the detection signal for the ion sample (e.g. values to the left hand side of FIGS. 1A and 1B); and the one or more relatively high measures of intensity of the detection signal for the ion sample are weighted to provide a greater contribution to the weighted average than the one or more relatively low measures of intensity of the detection signal for the ion sample. In this way, less contribution to the overall average is made by values that are taken with relatively low ion counts and hence low accuracy. In some cases, the weighted average may exclude one or more measures of the rate of decay of the ion sample for which the measure of intensity of the detection signal for the ion sample are below a threshold value. For instance, it may be desirable to ignore any values taken with particularly low ion counts if such values are known to lead to erroneous results.

In the aspects described herein and continuing to use the generalised language used previously, the measure of the rate of decay of the ion sample may be a decay constant or a collision cross section. Since the CCS can be determined from a decay constant (and vice versa), any measure of the rate of decay of an ion sample can be used in the algorithms in this disclosure.

As mentioned previously, the actual number of ions in a packet can be difficult to establish but is proportional to SNR of a peak at a given transient duration and decay constant. Thus, in the generalised language used previously, determining an adjustment function (e.g. scaling factors) for the ion sample may be based on a ratio between the measure of intensity of the detection signal for the ion sample and the measure of intensity of the detection signal previously obtained for the calibrant. For example, under certain conditions, the curves in FIGS. 1A and 1B may have essentially the same form but be related approximately by a constant of proportionality. Hence, a measurement taken on an ion sample can be corrected by exploiting this relationship. Taking a ratio between two measurements reduces the need to account for various complex factors.

As a hypothetical example, consider a measurement taken on an ion sample from a packet having, for example, 100 ions (or an equivalent SNR). Such a sample may provide a data point towards the left hand side of FIGS. 1A and 1B (i.e. close to the lower detection limit), so any calculation of decay constant or CCS might be an overestimate because of space charge or other effects. However, it was known from an experiment on the calibrant (which would of course have a known composition and known decay constant and CCS) that an ion packet having 100 ions of calibrant led to a decay constant that was overestimated by 10%. Thus, a decay constant can be determined for the ion sample using the data point from the packet having only 100 ions, and can be made more accurate by reducing the calculated decay constant by 10%. It will be appreciated that a similar methodology can be implemented for CCS calculations. Hence, in general terms, the disclosure provides adjustment functions for the ion sample that indicate an amount by which to adjust the rate of decay over time of the detection signal for the ion sample, to compensate for error in measuring the rate of decay over time of the detection signal for the ion sample. The adjustment functions may define an offset (e.g. an offset that can be added or subtracted to a measured value) or a scaling factor that provides an indication of a percentage error. In such a case, adjusting the measure of the rate of decay over time of the detection signal for the ion sample using the adjustment function may comprise scaling the measure of the rate of decay over time of the detection signal for the ion sample by the scaling factor. The adjustment functions described herein could be any program that receives a mass spectral signal and outputs a corrected CCS and/or decay constant by comparing the mass spectral data against mass spectral data of a calibrant. Accordingly, a more accurate measure of the rate of decay of the ion sample can be obtained.

As an example, a multivariable function $$\tau_{correct} = \tau_{correct}\left(\tau_0; SNR; \frac{m}{z}, X\right)$$

can be defined, whose output is a corrected decay constant. This function $\tau_{correct}$ takes inputs of: an uncorrected decay constant $\tau_0$ determined from mass spectral data; a signal-to-noise-ratio SNR of mass spectral data; and a mass-to-charge ratio m/z indicated by mass spectral data. It also could use a set of other inputs X, such as total SNR for the whole spectrum, characteristics of the nearest or most intense mass peaks, etc. Hence, X may be considered an optional variable that could be omitted.

The form of the function $\tau_{correct}$ may be determined for a calibrant having a known composition. Since the calibrant has a known composition having various known constituent species, a range of correct m/z values for the calibrant are known. Moreover, a range of correct decay constants (i.e. the correct outputs of the function $\tau_{correct}$) will be known for a good calibrant. Thus, the form of the function $\tau_{correct}$ for a particular experimental setup may be determined using data obtained from the calibrant by solving an optimisation problem. Then, when embodiments of the present disclosure perform a step of determining an adjustment function for an ion sample, this may mean calling the function $\tau_{correct}$ as determined using the calibrant.

It will be appreciated that other inputs to $\tau_{correct}$ could be used. For instance, the function $\tau_{correct}$ could take ion count in a packet as an input rather than SNR, and could take the frequency of the mass analyser detection signal as an input rather than m/z. These simply amount to co-ordinate transformations. Moreover, some of the inputs of $\tau_{correct}$ might be omitted. For instance, where a full MS scan is desired, it may be preferable for both SNR- and m/z- (or frequency-) based corrections to be made, but for isolated scans, corrections based only on SNR (or any other measure of intensity) might be adequate. For m/z based correction, a calibrant mixture could be used, comprising a plurality of calibrant ions of different m/z (preferably over a wide range), so that the relationships of FIG. 1 are obtained for each m/z ion, and then, the derived adjustment values at each ion number may also vary with m/z, so that a separate curve of adjustment value vs. m/z can be obtained at each ion number and used for correction. Ideally, a mixture of as many calibrants as possible should be used for calibration. For example, it could be our FlexMix which we use for instrument calibration, or, alternatively, a mixture of peptides produced by digestion of bovine serum albumin (a standard quality control sample in proteomics), etc. Then we could interpolate between calibrated peaks using e.g. splines.

In any event, the function $\tau_{correct}$ as defined above provides an output that is a corrected decay constant. Of course, alternative functions could be defined and fall within the scope of the present disclosure, such as:

$$\tau_{offset} \equiv \tau_{correct}(\tau_0; SNR; m/z) - \tau_0$$

$$\tau_{scaling} \equiv \tau_{correct}(\tau_0; SNR; m/z)/\tau_0$$

The outputs of $\tau_{offset}$ would be an amount that would need to be added to an uncorrected decay constant to provide a corrected value. Similarly, the outputs of $\tau_{scaling}$ would be a scaling factor by which an uncorrected decay constant would need to be scaled to provide a corrected value. It will also be understood that the function $\tau_{correct}$ could be replaced by an equivalent function $\sigma_{correct}$ that receives the same inputs and provides correct CCS values (or offsets/scaling factors) as its outputs.

A further way in which accurate decay constants or CCS values may be calculated is as follows. A curve like the curve in FIG. 1 may be obtained for a calibrant (i.e. the measure of decay constant or CCS is found for a range of ion numbers, S/N or intensities etc.). Interpolation between points may be used, or a fitting function may be used to approximate the curve. Then, from that curve, adjustment values can be found for each ion number, S/N or intensity (based on the deviation from the "known' decay constant). Finally, the 'ion sample' decay constant or CCS can be corrected by using the adjustment value (from the calibrant curve) corresponding to the same ion number, S/N or intensity of the ion sample.

Throughout the present disclosure, the measure of intensity of the detection signal for the ion sample may comprise any one or more of: total ion count; signal amplitude; and/or signal-to-noise ratio. Moreover, the measure of intensity of the detection signal previously obtained for the calibrant may comprise any one or more of: total ion count; signal amplitude; and/or signal-to-noise ratio. The measure of mass-to-charge ratio of the detection signal for the ion sample may comprise a frequency (or, equivalently, a time period of the signal); and/or the measure of mass-to-charge ratio of the detection signal previously obtained for the calibrant may comprise a frequency (or, equivalently, a time period of the signal).

Figure 2B:
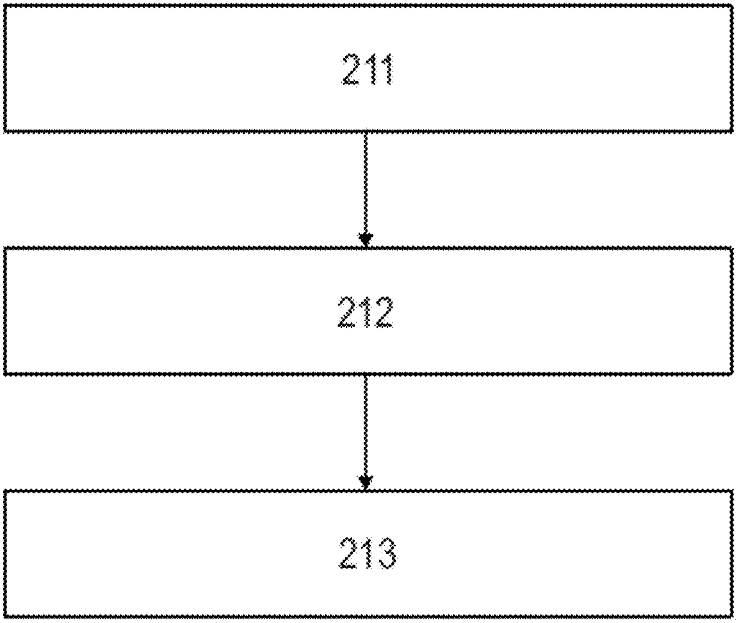
FIG. 2B shows a method for determining a measure of a rate of decay of an ion sample performed by a mass spectrometry system according to a second embodiment.

Turning next to FIG. 2B, there is shown a method performed by a mass spectrometry system according to a second embodiment. The method of FIG. 2B is similar to the method of FIG. 2A in some respects. The method of FIG. 2B is a method for determining a measure of a rate of decay of an ion sample undergoing mass analysis in a mass analyser with image current detection. The method comprises a first step 211 of receiving a detection signal for the ion sample from a transient detection of the ion sample obtained using the mass analyser, the detection signal for the ion sample having a rate of decay over time. This may be essentially the same as step 201 of FIG. 2A. The method may further comprises an optional second step 212 of determining whether the resolution of the detection signal for the ion sample indicates that the rate of decay over time of the detection signal for the ion sample is dominated by collisional effects (e.g. self-bunching). This can be obtained by considering, for example, whether the resolution of the mass spectral detection signal is in the stable plateau of FIGS. 1A and 1B.

It does not necessarily matter whether self-bunching is occurring or not, but whether self-bunching is occurring does affect which corrections are used. Thus, step 212 may be omitted, or step 212 may instead be used for quality control. For instance, step 212 may comprise determining any one or more of: whether a peak is baseline-resolved (i.e. whether both sides of a peak reach the baseline without interfering with other peaks); is SNR high enough even to consider the peak; does the peak belong to an isotope cluster, and then whether the peak will be included in a weighted average or not.

Finally, the method comprises a third step 213 of determining the measure of the rate of decay of the ion sample. If the resolution of the detection signal for the ion sample indicates that the rate of decay over time of the detection signal for the ion sample is dominated by collisional effects, determining the measure of the rate of decay of the ion sample is based on the rate of decay over time of the detection signal for the ion sample. For instance, if the data is from the stable plateau of values, then no correction of the decay constant or CCS measurement may be required and the decay constant of the signal can be used to calculate CCS or decay constant of the ion sample. On the other hand, if the SNR of the detection signal for the ion sample indicates that the rate of decay over time of the detection signal for the ion sample is not dominated by collisional effects, determining the measure of the rate of decay of the ion sample is based on an extrapolated resolution for the ion sample. The extrapolated resolution is an expected resolution of the detection signal in conditions in which the rate of decay over time of the detection signal for the ion sample is dominated by collisional effects. Thus, if the value is taken from the left hand side of FIGS. 1A, 1B, and 3(III) then the resolution may be determined by extrapolation to a region in which conditions are collision-dominated and therefore more accurate. Thus, the disclosure provides a method that can automatically improve the accuracy of decay constant and/or CCS measurements.

In the present disclosure, by "dominated", it is meant that the decay rate of the detection signal can be fitted to a first order exponential decay curve to a degree that exceeds a minimum accuracy threshold. That minimum threshold may, for example, be user set or factory set/defined (e.g. the minimum threshold might be programmed into hardware during manufacture) and represents a point at which the decay rate of the transient goes from being exponential to an acceptable degree, to being no longer acceptably exponential such that the fitting methods described herein fail to work. It is to be appreciated, in that regard, that there is no well-defined cut-off point in the transition from exponential to non-exponential decay. In some cases, a graph of resolution against SNR may show a point of inflection (e.g. where the resolution starts to plateau after rising constantly) and this point of inflection could also be considered the threshold above which conditions are said to be collision-dominated. Alternatively, conditions may be said to be "collision-dominated" when the resolution (or other equivalent measurement) achieves a certain percentage (say 80%, 90%, 95% or 99%) of its value in the stable plateau region.

Figure 3:
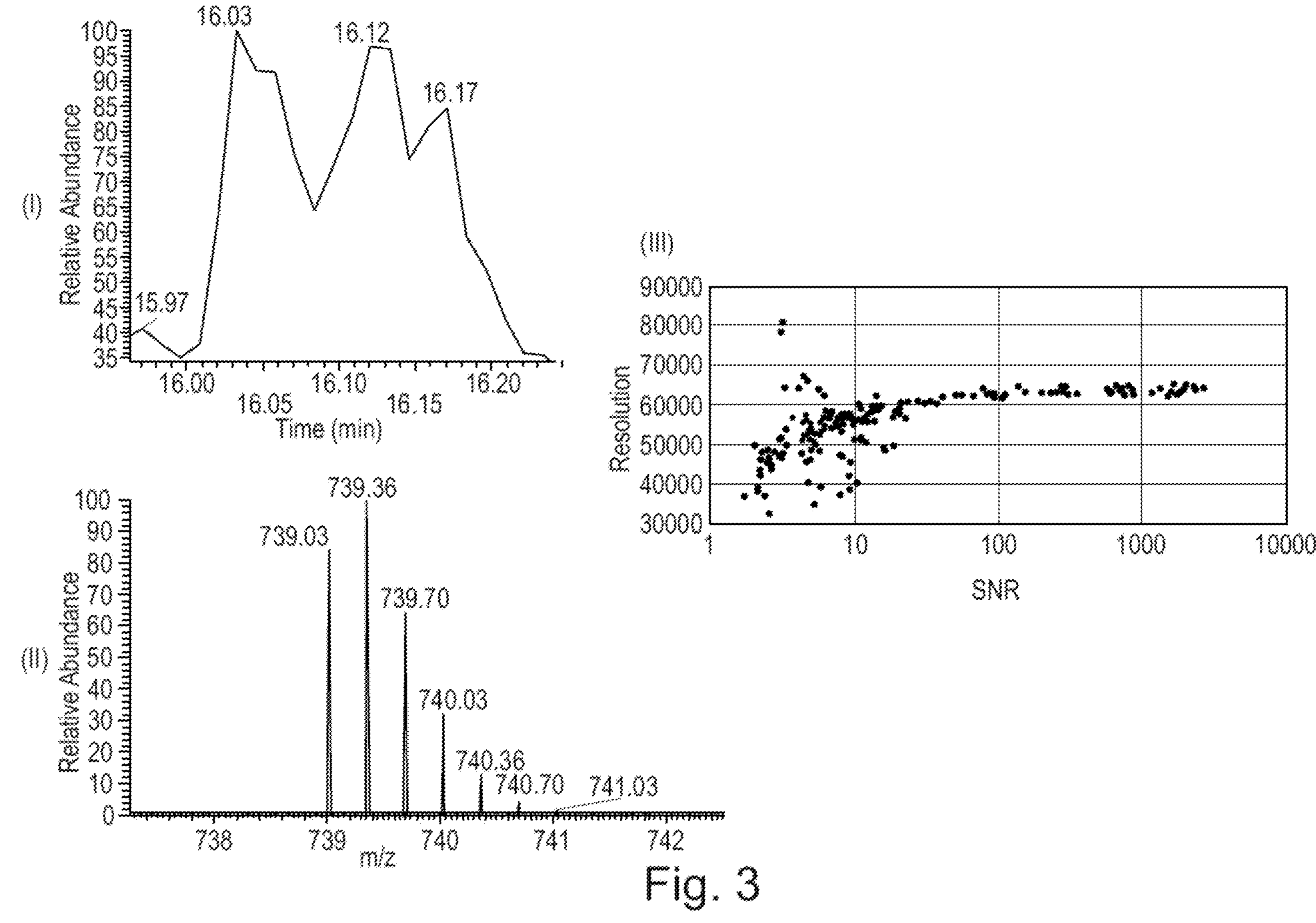
FIG. 3 shows data suitable for implementing the first and second embodiments.

FIG. 3 shows an LC elution profile (I) of a charge state Z=3+ isotopic envelope of a compound with a monoisotopic weight at 2200.09 Da (II). The distribution of the resolution values of its isotopes across the elution profile is plotted as a function of its Signal to Noise Ratio in $\log_{10}$ scale (III). In a general sense, the plurality of measures of the rate of decay of the ion sample may be determined for a plurality of retention times of an elution profile. Such data can be used to ensure that measurements are taken in the most informationally-reliable regions (i.e. preferably close to or in the self-bunching region). While it is desirable to have high intensity peaks that are in the self-bunching region, there is usually a log-normal distribution of intensities in mass spectra, so most of peaks are of lower abundance. For an LC (or GC) experiment, some eluting samples have very low abundances and so it may not be possible to obtain measurements from the stable plateau.

An LC profile or, in the case of FIG. 3(I), Selected Ion Monitoring (SIM), may be used as a measure reflecting the number of ions per ion packet. Therefore, an initial step may comprise identifying the value of the decay parameter at the high ion number 'plateau' level (e.g. the stable region in FIG. 1B). As the resolution and the decay are closely related (i.e. proportional in the case of the collisional-only regime), for the determination of the purely collisional component of the decay constant, the strategies are identical if the decay parameter is known explicitly or one is using the resolution as an intermediary.

There is no need to limit analysis to a single m/z species per compound for CCS analysis. Since all the isotopes within a given cluster have exactly the same size (and differ only in their mass), it can be beneficial to use the resolution data across the entire isotopic envelope as well. Therefore, the term "ionic species" can be generalised to all the isotopes for a given charge state of a given compound. FIG. 3 (II) shows seven peaks spaced apart by 0.33 m/z, indicating isotopic variants of a triply charged ion. In general terms, therefore, in the methods described herein, the plurality of measures of the rate of decay of the ion sample may be determined for a plurality of different isotopic compositions. Thus, the weighted averages described herein may be based on measures of the rate of decay for a plurality of isotopic variants of the ion sample. This can allow analysis of multiple isotopic variants of a single analyte, which can improve the error statistics.

Since higher intensity peaks tend to provide more accurate estimations of the resolution value, it might be beneficial to use only values that are near or at the apex of the SIM peak apex (i.e. near the plateau) to calculate decay constants. Nevertheless, this is not necessary in all embodiments. For example, as will be described in greater detail with reference to FIG. 5, some embodiments of the present disclosure determine decay constants using the following procedure. First, a set of data, such as that of FIG. 3(III) is obtained. Then, a line of best fit is determined, to try to produce a relationship between SNR and resolution. In FIG. 3(III), this line of best fit would plateau at constant Resolution of approximately R=63000 above SNR values of approximately 50. Then, when determining a decay constant or CCS measurement for a species having an SNR of, say, 10, and a corresponding R=55000, it would be apparent that this particular species was not undergoing self-bunching, because R=55000 is significantly below the plateau at which self-bunching occurs. Thus, this species would be expected to have a large error in decay constant and CCS, since decay constant and CCS can be calculated directly from R and this measured value of R=55000 is indicative of sub-optimal experimental conditions. This large error in decay constant and CCS could be corrected by using a value of R=63000 rather than R=55000 when determining decay constant or CCS. This is because if it had been possible to obtain a higher SNR (e.g. by having a great quantity of analyte, and so more ions in the packet), then resolution would have been R=63000. Such a line of best fit may take into account all of the points in FIG. 3(III).

Alternatively, in order to improve statistics, one can use weighted averages of the resolution for all the observed peaks for a specific ionic species, as in:

$$\tilde{R}_{m/z} = \sum_i (W(I_i) R_i C_i) / \sum_i W(I_i) \tag{I}$$

where $\tilde{R}_{m/z}$ is the weighted value for the resolution, $R_i$ is the reported resolution values of each individual peak, $C_i$ is the correction of this value using calibrations from FIGS. 1A, 1B, 3 (III) ($C_i \geq 1$), $I_i$ is the intensity measure of an individual peak, and $W(I_i)$ is the weight assigned to a peak's resolution value as a function of its intensity. Weighted averages may be used to determine weighted values of resolution for different ranges of SNR. For example, a rolling average of the data in FIG. 3(III) could be taken to obtain a trend line. Alternatively, $\tilde{R}_{m/z}$ could be an weighted resolution that is weighted across only peaks that are in the self-bunching region (i.e. excluding peaks that are not at sufficiently high intensities to show self-bunching). The measure of intensity can be in a.u.'s such as an absolute value of peak's apex in magnitude or absorption FT spectrum, SNR, etc. The weight function can use fixed values for every value of intensity (e.g. $W(I_i)=1$ as in average), can be linear with respect to the weights (e.g. $W(I_i)=\text{const}*I_i$), or might reflect the non-linearity of the curves in FIG. 1B with more complex functionality $$(\text{e.g. } W(I_i) = const * I_i^p,$$

where ρ can be a constant). Other weighting strategies are also possible. In any event, a more accurate plot (which can be used to correct decay constants and CCS) of SNR (or an equivalent measure) against Resolution can be obtained by assigning lower weights to less intense peaks, to prevent peaks with large errors from skewing the determined trend line.

It is also possible to find parameters that describe the curves accurately enough to be able to extract the resolution values reliably. For this strategy to work a model describing the phenomenon is required. The preferred choice for such a model is a function that plateaus in the y-axis (here representing decay constant or resolution). The most preferred example of a smooth function with such a property is an exponential plateau:

$$Y = Y_{plateau} - K * e^{-\gamma * x} \tag{II}$$

where $Y_{plateau}$, is the sought value of the plateau, and K and γ coefficients describe the rate of climb of the function before $Y_{plateau}$ is reached. It is important to note that such a function does not need to be smooth. For the purposes of the disclosure, such a function could be a piecewise function, e.g.

$$Y = \begin{cases} Y = a * x^2 + b * x + c & \text{for } x < x_{critical}(Y_{plateau}) \\ Y = Y_{plateau} & \text{for } x > x_{critical} \end{cases}, \tag{III}$$

where coefficients a, b, c describe a parabolic climb before reaching a plateau at a point $x_{critical}$. The function could also be a piecewise linear function that approximates a smooth function. These functions are merely examples, and embodiments of this disclosure can use other functions.

The parameters for these functions can be obtained in a number of different ways, including minimisation of the discrepancy between observed values and those predicted by the function. An optimisation problem can be stated in terms of minimising a norm of that discrepancy, e.g. in L-p space (when p=2 this optimisation procedure is known as least squares). It is worth noting that it might be beneficial to account for other idiosyncrasies of the data in the optimisation procedure (e.g. the spread of the values tends to be higher for lower intensity peaks, as shown in FIG. 3 (III)). For instance, one can consider introducing weights as in weighted least squares:

$$\underset{\beta}{\text{argmin}} \sum_i w_i |\hat{y}_i - y(x_i, \beta)|^2 \tag{IV}$$

where β is a set of sought parameters, $y(x_i,\beta)$ is a value of the model function at a point $x_i$, $\hat{y}_i$—an observation at a point $x_i$, and $w_i$ is a weight associated with $\hat{y}_i$. The weights can be a function of intensity or some statistical properties (e.g. local σ of the spread). It might also be beneficial to pre-process the data before fitting by removing outliers or smoothing with a filter. Good examples of such pre-processing would be the application of different flavours (e.g. exponentially modified) of moving average filtering with varying period depending on the local statistical landscape of the data.

Regardless of the way in which resolution values are extrapolated, a relationship between resolution and decay constant is required to be able to exploit the plateau shown in FIGS. 1A, 1B and FIG. 3(III). Collisional decay in a FTMS generally follows an exponential law, i.e.

$$a(t) = a_0 \cos(\omega_0 t) * e^{-\tau t}, \tag{V}$$

where the intensity a of an oscillating with frequency $\omega_0$ signal decreases from its initial value of $a_0$ with time t with the rate τ following the exponential trend. After Fourier transformation the absorption mode spectrum has a Lorentzian peak $$A(\omega) = \frac{A_0}{1 + \left(\frac{(\omega - \omega_0)}{2\tau}\right)^2} \tag{VI}$$

with amplitude $A_0$, situated at $\omega_0$, and having the full width at half maximum (FWHM) of 2τ.

As Equation (VI) is the result of the result of Fourier transformation of Equation (V) for an infinite length signal, the peak width (which can be used to determine CCS) of 2τ may be a good approximation for fast decaying signals. In other cases, it may be beneficial to account for the finite duration of the FTMS transient signals.

One way to correct was proposed by Li, et al. (Dayu Li, Yang Tang and Wei Xu, Analyst, 2016, 141, 3554) by using the following expression:

$$\frac{e^{-T/\tau}\tau\left(e^{T/\tau} - \cos(T\Delta\omega') + \tau\Delta\omega'\sin(T\Delta\omega')\right)}{1 + (\tau\Delta\omega')^2} = \frac{e^{-T/\tau}\tau\left(e^{-T/\tau} - 1\right)}{2}, \tag{VII}$$

where T is the duration of the transient signal (which is known from the instrument settings) and Δω' is the observed spectral FWHM (i.e. the FWHM of the peak being used to determine the decay constant). Equation (VII) can be solved numerically to determine a more accurate relationship between peak width (i.e. FWHM in the frequency domain) and decay constant than the simplistic approximation that the FWHM is 2τ for a Lorenzian peak.

One way to determine if the correction in Equation (VII) is beneficial is to compare the Δω' to the limitation imposed on the resolution by the length of a time domain signal. Any FTMS transient can be expressed as a multiplication of an oscillating signal of infinite length by a square function of the duration T, which in the frequency domain translates into the convolution of an FT image of a signal with that of a windowing function, i.e.

$$e^{-iT\omega}\mathrm{sinc}\left(\frac{\omega}{T}\right). \tag{VIII}$$

Therefore, under the conditions when the FWHM of Equation (VIII) is comparable with Δω', it may be beneficial to employ the correction Equation (VII), whereas when Δω' is much larger, the benefits might not be as pronounced, especially for noisy signals. In the generalised terms used previously, the step of determining a measure of the rate of decay over time of the detection signal for the ion sample is based on a peak width of the detection signal for the ion sample (e.g. a width of a peak in the frequency domain do, which can be used to determine a decay constant). It is preferable that the step of determining the measure of the rate of decay over time of the detection signal for the ion sample takes into account (e.g. includes some correction for error caused by the use of a discrete Fourier transform on a finite-duration signal) a duration over which the transient detection of the ion sample occurs. For instance, a correction of the form of Equation (VII) may be appropriate and advantageous.

Figures 4A, 4B:
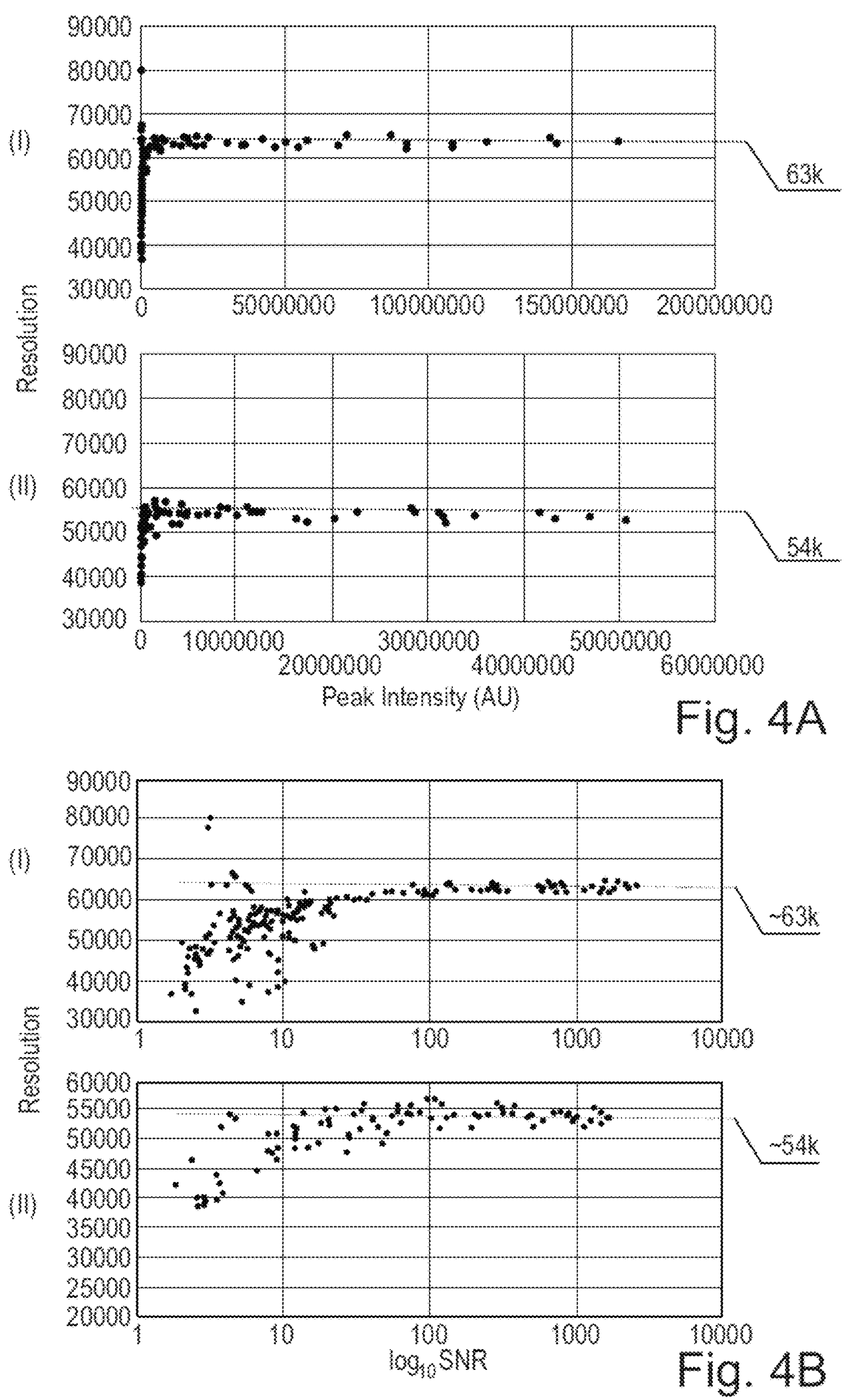
FIG. 4A shows resolution against peak intensity for the data of FIG. 3.
FIG. 4B shows the data of FIG. 4A in terms of resolution against signal-to-noise ratio.

FIG. 4A provides experimental data showing the effect of self-bunching. In FIG. 4A, the horizontal axis is the total ion count of a peak detected from oscillating ion clouds. The Y-axis is the observed values of resolution of selected peaks. The values of resolution are defined as $$\frac{m}{\Delta m},$$

where Δm is the FWHM of a peak (in the mass domain) at the position m. In FIG. 4A, the intensity is reported in arbitrary units (AU), but could also be presented in terms of signal to noise ratio (SNR) or in other units. The reported values are taken from an ion species at 739.03 Th, and charge state Z=3+. As the number of ions increases, so does the resolution up until it reaches a plateau, where ions tend to be "self-bunched". At this point, the ion cloud no longer 'dephases' and the only source of decay is the death of individual ions as a result of collisions with background gas molecules. The data of FIG. 4A are the results of Orbitrap FTMS experiments taken on the same system under different pressure conditions: (I) low pressure, HCD gas valve turned off; and (II) high pressure, gas on. In FIG. 4B, effectively the same plot is shown as in FIG. 4A. In FIG. 4B, resolution is plotted against $\log_{10}$ (SNR) with gas off/on. SNR is a preferred measure for quantifying the number of ions in a packet and the logarithmic plot of FIG. 4B serves to illustrate the plateau of resolution with increasing ion count more clearly.

Figure 5:
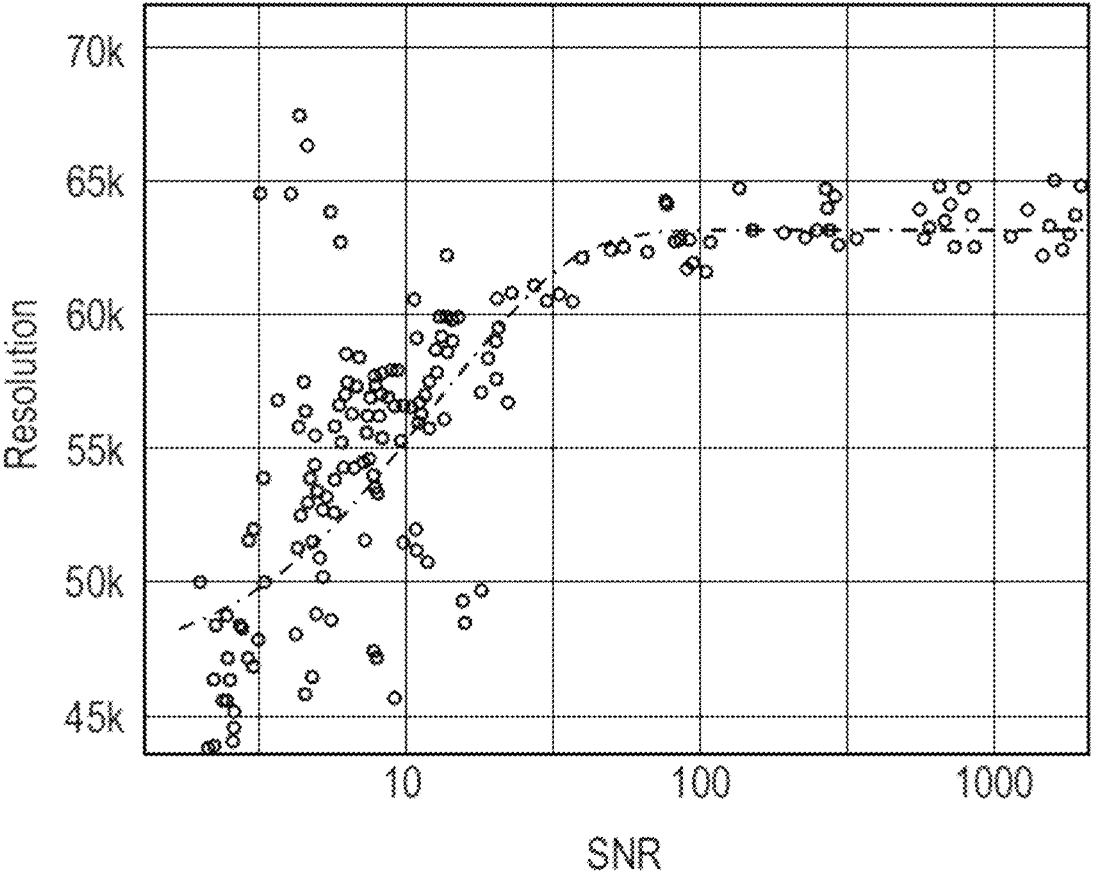
FIG. 5 shows observed resolution and SNR values with a fit that can be used to obtain extrapolated resolutions.

FIG. 5 provides an example of how data, such as the data shown in FIGS. 4A and 4B, can be used numerically to obtain improved CCS estimates using embodiments of this disclosure. All of the data in the example of FIG. 5 was collected on a commercial Orbitrap Exploris™ mass spectrometer. The resolution was set to 120 k, which corresponds to a transient length T=256 ms. Equation (IX) provides mass calibration parameters B and C in a relationship tying mass to frequency (kHz):

$$m/z = \frac{B}{f^2} + \frac{C}{f^4} \tag{IX}$$

In the example of FIG. 5, the values were B=169449512.441 and C=72890453.4333.

As described previously, the initial step in the evaluation of the CCS involves the determination of the decay caused by the collisions with the residual gas only. One approach is to evaluate the resolution at which self-bunching starts to occur. FIG. 5 shows the fitting of an exponential plateau function, as in Equation (III), to the observed distribution of the resolutions from FIG. 3(III), via minimisation of the $L_2$-norm.

The resolution plateau is situated at $Y_{platea}$=63070.3159, and is reached at SNR levels of ~50. As the resolution in mass domain is defined as $$\frac{m/z_{centre}}{\Delta m/z_{FWHM}},\ \Delta\omega'$$

or Δf (the FWHM of the frequency) can be obtained using Equation (IX). In particular, Equation (IX) can be used to demonstrate that for high frequencies where Equation (IX) is dominated by the $B/f^2$ term dominates the $C/f^4$ term, Δω' is proportional to: the frequency (478.840 kHz in this case); and the resolution at the plateau, which is 63070.3159. In this particular case, Δf=3.7961 Hz, which can be measured directly: to frequency FWHM from resolution in the mass domain, values for frequencies at the peak's half maximum can be calculated i.e. for the resolution of 63070.32 @ 739.0237 Da, the Δm/z at half maximum is 0.011717 and the masses themselves are 739.0237-0.011717/2=739.0178 and 739.0237+0.011717/2=739.0296, with the corresponding frequencies (following from Equation (IX)) being 478838.7 and 478842.5 Hz, giving Δf=3.796085. Since the mass resolution is close to the limit imposed by the duration of the transient (in this case it is ~80 k in the mass domain, which corresponds to Δf=2.9907 Hz), we cannot simply use 2τ=Δω' to estimate τ, but instead should use Equation (VII) for a more accurate determination. Solving Equation (VII) numerically gives a value for the obtained decay parameter of $\tau=0.3798\text{s}^{-1}$.

Once a decay value is obtained, the determination of CCS can be done as described in the Sanders J D et al. Using the fact that the pressure reading on the UHV gauge (for the data presented here it is $5.85\times10^{-10}$ mbar) is approximately 2× lower than the residual vacuum in the Orbitrap analyser, the cross section σ can be obtained as $$\sigma = \tau / \frac{PLf}{kT} \tag{X}$$

where P is the pressure inside the Orbitrap analyser, L is the length of an ion flightpath per oscillation along the Z-axis (here 65.1 mm), f is axial frequency of the ions (here 478.840 kHz), T is temperature (295K), and k is Boltzmann's constant. For this ionic species, the resulting value for the CCS is 424 $Å^2$, which is a reasonable cross section for a triply charged peptide in this mass range. Thus, it can be seen that the methods of the present disclosure can be used to determine accurate CCS values. In particular, this example shows how determining the measure of the rate of decay of the ion sample can be based on an extrapolated resolution for the ion sample, the extrapolated resolution being an expected resolution of the detection signal in conditions in which the rate of decay over time of the detection signal for the ion sample is dominated by collisional effects.

Returning to the generalised language used previously, in embodiments of the disclosure, determining whether the resolution of the detection signal for the ion sample indicates that the rate of decay over time of the detection signal for the ion sample is dominated by collisional effects may comprise: determining whether the resolution of the detection signal is stable (e.g. constant, such as in the stable plateau region of FIG. 5) with respect to increasing numbers of sample ions in the sample ion cloud used to generate the detection signal for the ion sample. Of course, as explained in detail herein, SNR is only one measure that resolution can be plotted against, and ion count or signal intensity could also be used. In the stable region, the gradient of resolution against SNR may be below a threshold value or approximately 0. Such a threshold might be set by a user or factory set.

Determining whether the resolution of the detection signal for the ion sample indicates that the rate of decay over time of the detection signal for the ion sample is dominated by collisional effects may be achieved by determining whether the sample ion cloud used to generate the detection signal for the ion sample includes sample ions in a quantity sufficient to cause self-bunching. This can be identified by looking at the mass spectral signal to identify signs that a sufficiently large number of ions is in the ion packet, or by observing that de-phasing stops occurring and an exponential decay is observed due to collisional effects dominating.

The extrapolated resolution for the ion sample may be determined from an extrapolated function that provides an expected resolution of the detection signal in conditions dominated by collisional effects. This may be as described with reference to FIG. 5. For example, the extrapolated function may be determined based on a plurality of measures of resolution and a plurality of measures of signal intensity that were not obtained in conditions dominated by collisional effects. Hence, the extrapolated function may be based on values taken from the left hand side of FIGS. 1A, 1B, 3(III) and 5. Such values can be used to infer the properties of the plateau on the right hand side by appropriate analysis of the data. In some cases (and particularly when the data used for extrapolation does not cover the whole of the stable plateau), it is advantageous for the extrapolated function to be based on a plurality of measures of resolution and a plurality of measures of signal intensity for one or more calibrants. In this way, the behaviour of the sample ions at higher SNR can be characterised more accurately by taking into account the behaviour of the calibrant.

The extrapolated resolution for the ion sample is determined from: a fitted function for a plurality of measures of resolution and a plurality of measures of signal intensity, that provides an expected resolution of the detection signal in conditions dominated by collisional effects. This can be as described in relation to Equation (II) or (III). Additionally or alternatively, an average resolution may be used, preferably a rolling average or a weighted average, for a plurality of measures of resolution and a plurality of measures of signal intensity, that provides an expected resolution of the detection signal in conditions dominated by collisional effects. This may be as described with reference to Equation (1).

When the extrapolated resolution for the ion sample is determined from a weighted average resolution for a plurality of measures of resolution and a plurality of measures of signal intensity, the plurality of measures of resolution may comprise one or more relatively high measures of resolution and one or more relatively low measures of resolution; and the one or more relatively high measures of resolution are weighted to provide a greater contribution to the weighted average resolution than the one or more relatively low measures of resolution. The plurality of measures of resolution could be corrected by using: a fitted function for a plurality of measures of resolution and a plurality of measures of signal intensity, that provides an expected resolution of the detection signal in conditions dominated by collisional effects; and/or an average resolution, preferably a rolling average or a weighted average, for a plurality of measures of resolution and a plurality of measures of signal intensity, that provides an expected resolution of the detection signal in conditions dominated by collisional effects. Thus, the statistics of the analysis can be improved by ensuring that low intensity peaks with high errors are not assigned high weights and do not contribute significantly to errors.

As described previously, the weighted average resolution may be based on resolution for a plurality of isotopic variants of the ion sample and/or the plurality of measures of resolution are determined for a plurality of different isotopic compositions. Analysing multiple isotopes gives a wide range of data points, which can reduce statistical errors. It may be unavoidable that isotopes are analysed, because isotopes will always be present in a sample unless they are deliberately isolated to exclude isotopic variants. Since isotopic variants of species tend to behave similarly and will be eluted from a GC or LC at roughly the same time, mass spectral analysis of a sample eluting from a GC or LC is likely to capture data for multiple isotopic variants of any particular sample. Thus, as described previously, it is preferable for a plurality of measures of resolution to be determined for a plurality of retention times of an elution profile, such as a gas chromatography (GC) and/or a liquid chromatography (LC) elution profile.

In view of the impact that ion count has on resolution, the data from FIGS. 1A and 1B can be used to determine confidence intervals for CCS (or decay constant) measurements and therefore define the usability of CCS (or decay constant) values. For example, for relatively large error bands of, for example, >10-20%, CCS could be only used for differentiating between very different chemical classes (e.g. linear molecules vs polyaromatic molecules, or lipids against peptides, etc.) or for analysis of collision-induced unfolding of intact proteins or protein complexes. For low errors of the order of 1%, CCS could be used to reduce the search space within a single charge state of a single class of compounds, e.g. in lipidomics or bottom-up proteomics. Additionally or alternatively, CCS can be used as a quality control measure to flag peaks that are likely to mask interference of several peaks, as indicated by unexpected values of CCS. For instance, interfering peaks are shown in FIG. 4 of Lyutvinskiy Y et al. (Adding colour to mass spectra: Charge Determination Analysis (CHARDA) assigns charge state to every ion peak. ChemRxiv. Cambridge: Cambridge Open Engage; 2021). Interference effects could be identified via irregularities in CCS values (and could, for example, manifest as step changes in CCS while CCS is being determined). Thus, in a general sense, the methods described herein may further comprise using a measure of the rate of decay of an ion sample to: classify the ion sample; and/or to detect interfering species in the ion sample.

Figure 6:
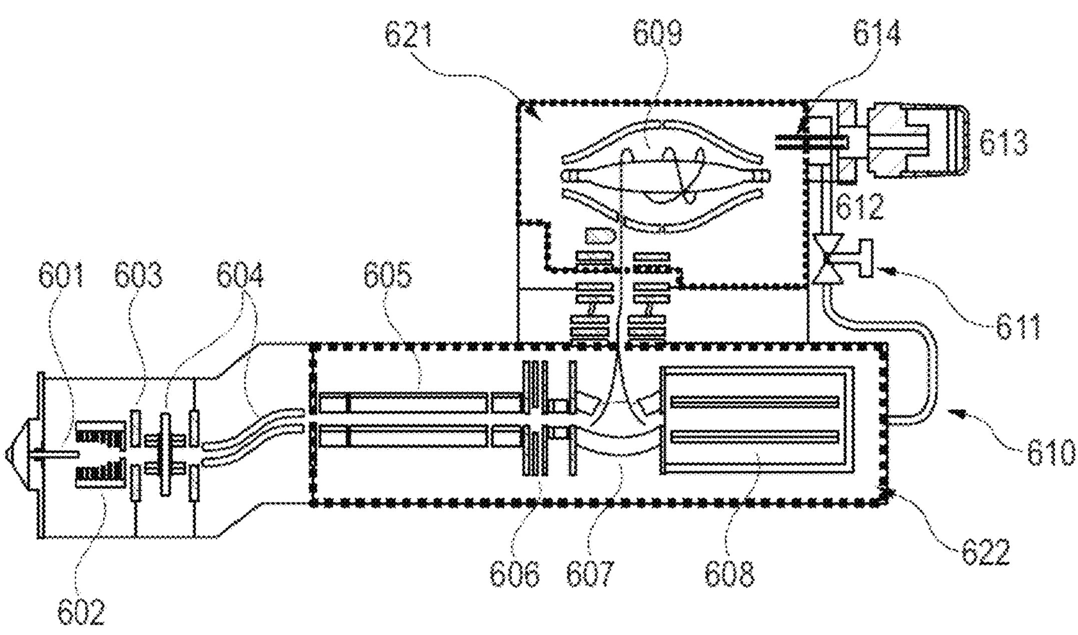
FIG. 6 shows a mass spectrometry system.

FIG. 6 shows a mass spectrometry system. The mass spectrometry system is a modified Thermo Scientific Exploris™ 480 mass spectrometer. The mass spectrometry system comprises a high capacity transfer tube 601, an electrodynamic ion funnel 602, an EASY-IC internal calibrant source 603, an advanced active beam guide (AABG) 604, advanced quadrupole technology (AQT) 605, an independent charge detector 606, a C-trap 607, an ion routing multiple 608 and an ultra-high field Orbitrap mass analyser 609, all of which are found in existing Thermo Scientific Exploris 480 mass spectrometers. The mass spectrometry system includes pressure control in the Orbitrap compartment.

The mass spectrometry system further comprises pressure regulation components for the hybrid quadrupole/orbital trapping instrument. The mass spectrometry system comprises a first vacuum region 621, in which the orbital trapping mass analyser 609 is situated. The first vacuum region 621 is at a first vacuum level, usually ultra-high vacuum. The mass spectrometry system comprises a second vacuum region 622 at a second vacuum level that is a lower vacuum level (i.e. higher pressure) than the first vacuum level. The quadrupole mass filter 605, independent charge detector 606, C-trap 607 and ion routing multipole are in the second vacuum region 622.

The mass spectrometry system comprises bellows 610 connected to the second pressure region 622 close to the ion routing multipole 608. The bellows 610 connect to a valve 611, which is connected to a ConFlat (CF) T-piece 612. The T-piece 612 is connected to the first pressure region 621. An ion gauge with heater gasket 613 is connected to a tube 614 that terminates within the first vacuum region 621 so that the ion gauge 613 can measure the pressure within the first vacuum region. The bellows 610, valve 611 and T-piece 612 may constitute a first fluid connection between the first and second vacuum regions. The fluid connection could of course be any means for allowing gas to be transferred from one vacuum region to another. Various combinations of tubing, piping and/or conduits could be employed.

Gas is introduced into the mass analyser 609 from the quadrupole compartment 605 of the hybrid quadrupole/orbital trapping instrument, where pressure of 3-5×$10^{-5}$ mbar is formed by nitrogen coming from the ion source (about 20%) and nitrogen leaking from the ion routing multipole 610 via the C-trap 607. Even catastrophic in-rush of such pressures into the UHV region of the mass analyser 609 will not result in a high-voltage breakdown.

Unlike a traditional leak line from atmospheric or even higher pressure, this gas leak arrangement permits the use of relatively simple valves 611 of larger cross-sections without long and narrow capillaries to protect the system from unintended venting. For example, a Parker Series 9 Miniature HV-compatible Calibrant Valve may be used under pulse-width modulation (PWM) control. As a result, higher tolerance to dust and errors is achieved. Preferably, the PWM operates under feedback loop correction based on the resulting UHV. For instance, the ion gauge 613 readings may be used to control the amount of gas leaked via the valve 611 and hence control the pressure within the mass analyser 609. By controlling the pressure under which ions are analysed in the mass analyser 609, their decay constants can be controlled to obtain accurate measurements of decay constant and collision cross section. The mass spectrometry system may constantly monitor pressure within the mass analyser and may essentially keep pressure constant using such a feedback loop. However, using the techniques disclosed herein, if pressure does drift from the chosen constant value, then it may be possible to introduce corrections into the calculation for CCS and/or decay constant, to take into account the pressure drift.

Hence, returning to the general terms used previously, the mass spectrometry system may comprise a controller configured to operate the valve so as to control the pressure within the first vacuum region based on: the pressure within the first vacuum region (e.g. to ensure that the pressure in the first vacuum region is appropriate for analysis); and or the measure of the rate of decay over time of the detection signal for the ion sample (e.g. to ensure that an appropriate transient detection time is used). The mass spectrometry system may further comprise a pressure sensor (e.g. ion gauge 613, although other types of pressure sensor could be used, such as a Bayard-Alpert gauge) configured to measure the pressure within the first vacuum region and to provide the measured pressure to the controller. Pressure in the trap could also be estimated based upon decay rates of transients, as described in U.S. Pat. No. 9,460,905-B2, which is incorporated herein by reference in its entirety. The methods described herein may comprise controlling the pressure within the mass analyser, and the mass spectrometry systems may be configured to control the pressure within the mass analyser, to control: the rate of decay over time of the detection signal for the ion sample; and/or the rate of decay over time of the detection signal for the ion sample. The first vacuum region may be at less than 3×$10^{-8}$ mbar (3×$10^{-6}$ Pa) and/or the second vacuum region is at from 1×$10^{-5}$ mbar (1×$10^{-3}$ Pa) to 5×$10^{-5}$ mbar (5×$10^{-3}$ Pa). For an Orbitrap region of a mass spectrometry system, the vacuum should be good enough for long transients, so the vacuum level could be set to provide a long mean free path, such as exceeding e.g. 1000 meters, or even longer. Other pressures could be used. For example, in some cases, the first vacuum region could be at less than 5×$10^{-9}$ mbar and/or the second vacuum region could be at 2×$10^{-5}$ mbar, 3×$10^{-5}$ mbar, or 4×$10^{-5}$ mbar.

Preferably, gas is introduced through the same port as used for UHV pressure measurement. However, a precaution may be taken to preserve correct operation of the UHV gauge. In FIG. 6, this can be achieved by connecting the ion gauge 613 to the UHV compartment by a long tube 614 that does not directly connect to the gas leak as it could accept gas molecules at least after one or more reflections from chamber walls. Hence, in a general sense, the pressure sensor may be connected to the first vacuum region by a second fluid connection that is not directly connected to the second vacuum region.

While a particular advantage of the system of FIG. 6 is that relatively cheap and simple valves 611 can be used due to the particular gas leak, various valves can be used. For instance, a high quality valve (e.g. a sapphire valve) could be used. In such cases, a gas leak from atmospheric or even higher pressure could be accommodated.

In the general terms used previously, the mass analysers of the present disclosure are preferably Fourier transform mass analysers and are preferably an orbital trapping mass analyser or a Fourier-transform ion cyclotron resonance mass analyser. Various other multi-reflection electrostatic traps could be also used, such as any one or more of: a Cassini trap, a linear electrostatic trap, a ConeTrap, etc. Various other mass analysers could be used, such as any one or more of: a multi-reflection time-of-flight analyser, an open or closed electrostatic trap, a charge-detection mass spectrometry (CDMS) detector, etc. The second vacuum region (e.g. the vacuum region used for the gas leak) may comprise any one or more (and optionally all) of: a quadrupole; a charge detector; an ion trap, such as a C-trap; and/or an ion routing multipole. The mass spectrometry systems may further comprise an ion routing multipole and/or a C-trap, wherein the fluid connection permits gas to be introduced from the second vacuum region to the first vacuum region via the ion routing multipole and/or the C-trap. The gas introduced from the second vacuum region to the first vacuum region may be leaked from a quadrupole of the mass spectrometry system.

In the methods and mass spectrometry systems described herein, it may be preferable to ensure that the pressure within the mass analyser is the same for analytical measurements of a sample as it is for analysis of the calibrant. Nevertheless, the adjustment functions and scaling factors described herein can take into account the effects of pressure. When pressure is kept constant, there is generally no need to correct measured values to account for pressure changes. However, pressure can change randomly (e.g. due to temperature changes), so in some cases it may be preferable to inject calibrant (e.g. Calmix, which includes approximately 10 species) periodically to ensure reliable operation. Whichever calibrant is used, the calibrant is likely to have isotopes, so isotopic variant peaks can also be used for calibration. Different isotopes have different intensities and so would have different decay rates. Thus, if there are three isotopes, then analysis of an isotope will lead to values being taken at three different points on the curves of FIGS. 1A and 1B.

Preferably, pressure is set so as to achieve a desired signal decay for a given set of analytes (e.g. multiply charged peptides) at a given transient length. For example, signal decay (i.e. the ratio of final intensity to initial intensity) for +2, +3, +4 tryptic peptides would preferably be 2-4 fold at an MS1 resolution setting of 60 K (corresponding to a 128 ms transient for high-field Orbitrap analyser). This would correspond to a certain decay of calibrant ion (for example, 1.5× over the same transient as it has lower m/z and +1 charge) as determined from previous experiments. Thus, pressure will be increased (e.g. through modulation, such as PWM control of the valve 611) until a desired decay of calibrant is reached and then pressure is kept approximately constant for all experiments. Over the duration of experiments, it may be preferable to occasionally (e.g. at the start of each LC/MS run) measure the calibrant and adjust m/z as well as CCS of analytes according to any drift experienced.

Many modifications to the arrangement of FIG. 6 will be apparent. For instance, the vacuum regions can be at various different pressures and can accommodate various different components. Similarly, while a Thermo Scientific Exploris™ 480 mass spectrometer is shown, other Fourier transform mass spectrometry systems may be used. For instance, a Q Exactive™ GC hybrid quadrupole-Orbitrap mass spectrometer system could similarly be used. Various types of fluid connections can be provided to leak gas from one vacuum region to another and the disclosure is not limited to the specific examples of bellows and valves shown in FIG. 6.

Figure 7:
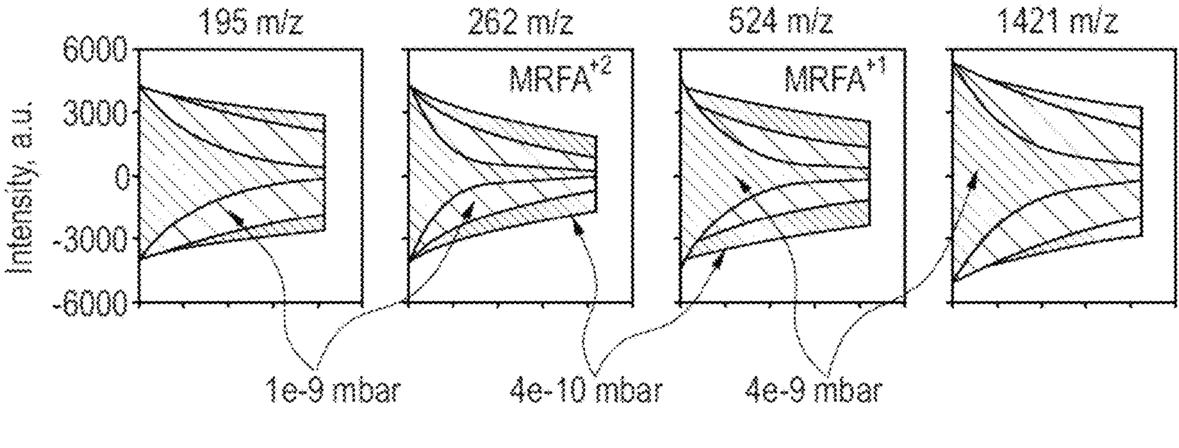
FIG. 7 shows the effects of pressure on decay constants.

FIG. 7 shows the transient signal (in arbitrary units, a.u.) of different species (195 m/z, 262 m/z, 524 m/z and 1421 m/z) from a calibration mixture at different pressure settings ($4\times10^{-9}$ mbar, $1\times10^{-9}$ mbar and $4\times10^{-10}$ mbar). Such data can be provided by the mass spectrometry system of FIG. 6 using the pressure control described in relation to FIG. 6. FIG. 7 shows ion signal decay for different m/z for a calibration mixture over a 512 ms transient duration. It can be seen that the +2 charge state of MRFA peptide exhibits accelerated decay in comparison to the +1 charge state of the same peptide.

FIG. 7 shows accelerated decay of higher charge states of the same compound, which is thought to be due to higher center-of-mass collision energy. This trend is especially visible on a larger-scale study of tryptic peptides of HeLa digest, as shown below. Faster signal decay results in somewhat reduced resolution following Fourier transform and therefore could be extracted directly from RAW files saved by mass spectrometer data acquisition system.

Figure 8:
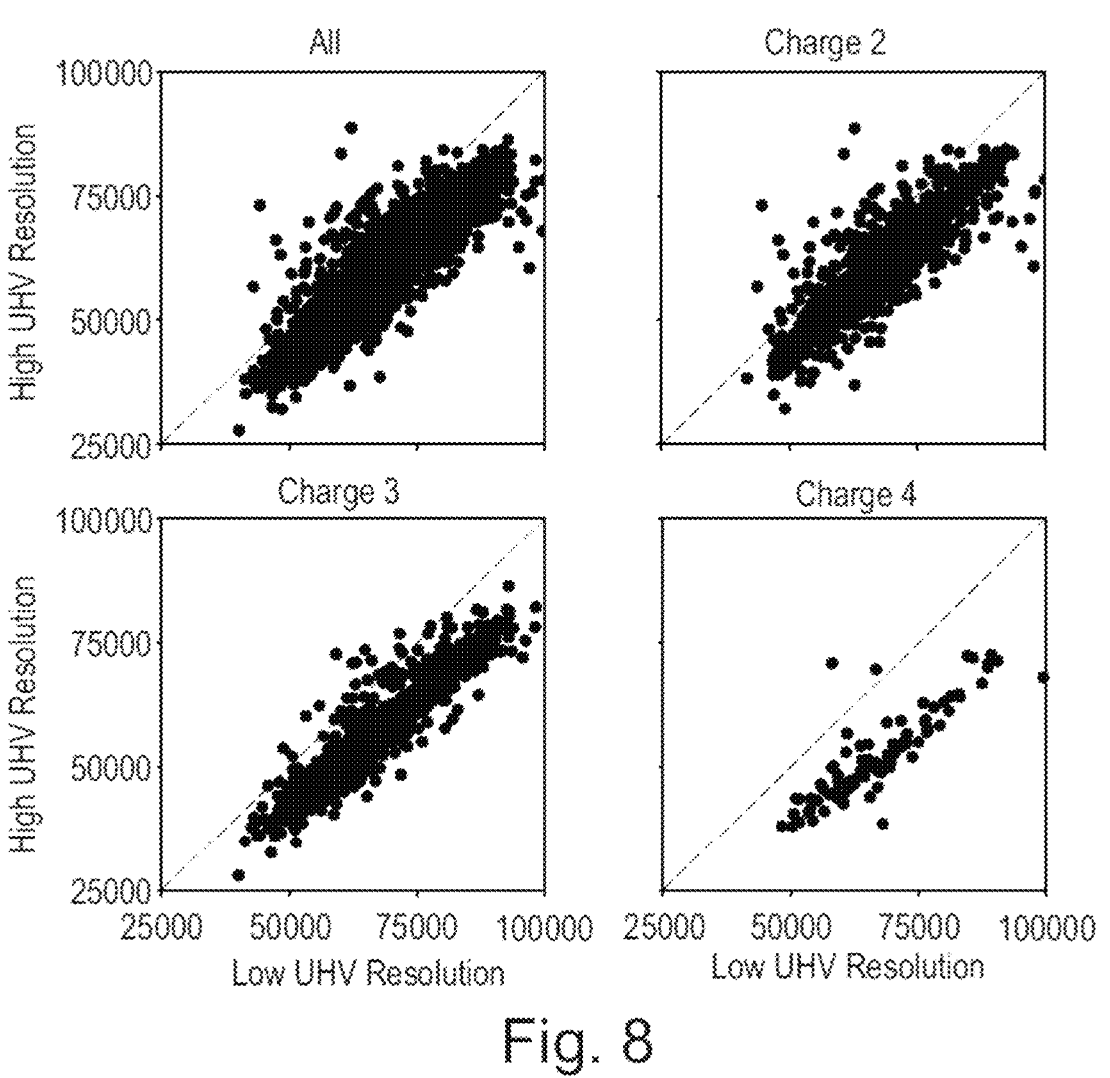
FIG. 8 shows the effect of pressure on resolution.

The graph of FIG. 8 shows the recorded resolutions of thousands of tryptic peptides of different masses for different charge states at elevated pressure versus standard operating conditions of low pressure. In particular, FIG. 8 is a comparison of recorded resolutions at elevated pressure ("High UHV" of $4\times10^{-9}$ mbar) versus standard operating conditions of low pressure ("Low UHV" of $4^{-10}$ mbar) for different charge states. If there were no reduction of resolution, all points would be located on the diagonal line (which would indicate that low and high pressure resolutions are the same). However, the sets of data in FIG. 8 actually show data points that fall on a lower line parallel to the diagonal line, indicating that, on average, resolution at high pressures is lower than at low pressures.

As resolution is m/z-dependent, it covers the range from 40000 to 100000 for the complete mass range of measured peptides. The relative resolution reduction is higher for lower recorded resolutions, which simply corresponds to the fact that higher mass for each given charge state leads to faster decay.

Figure 9:
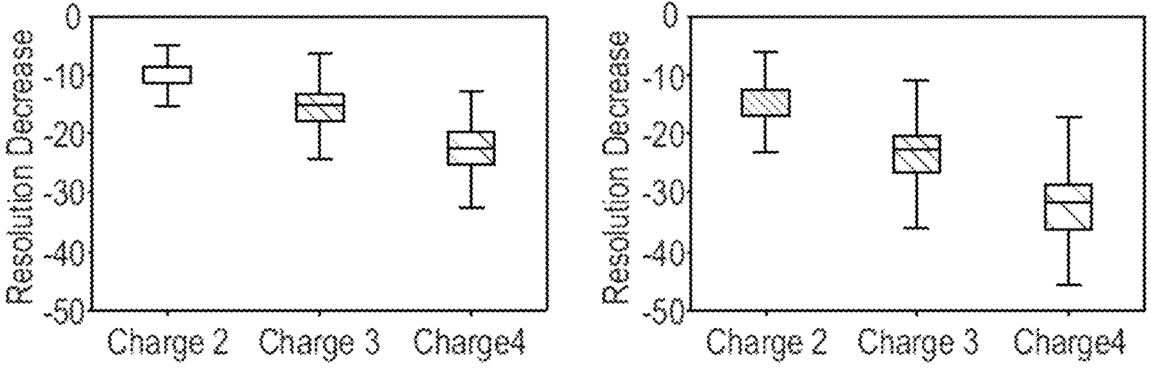
FIG. 9 shows a summary of the data in FIG. 8.

FIG. 9 shows an overview of this dependence is provided by where the relative reduction in resolution for each charge state is compared. The resolution decreases are shown relative to the case of no gas added. FIG. 9 shows a summary of the data in FIG. 8 (without correcting for mass dependence) for different pressures. Even though FIG. 9 does not include mass dependence, it already shows the diagnostic value of such measurements.

In the embodiments described herein, the detection signal for the ion sample may be obtained for an isolated ion sample or as a partial or full range MS scan. An advantage of the present disclosure is that intensity dependent (e.g. SNR-dependent) corrections can allow fully online determination of decay constants and CCS. While broad mass ranges (e.g. hundreds of mass units) tend to give lower intensities and so exhibit less self-bunching, such values may still need to be corrected (e.g. due to space charge effects). When a peak is isolated, there are more ions of a given species so more self-bunching (and higher resolution) occurs and so less correction may be required. In any event, the methods of the present disclosure are fully compatible with both isolated mass analysis and full MS scans.

It will be understood that embodiments provide measurements of ion collisional cross sections using transient decay at increased pressures in an Orbitrap™ mass analyser. In order to perform the measurements, the UHV pressure inside the Orbitrap™ mass analyser is regulated to different elevated levels. As described above, in the arrangement of FIG. 6, this is done by leaking/injecting a gas ($N_2$) directly into the Orbitrap™ mass analyser. While this method works as desired, it has been recognised that its implementation is challenging for a commercial instrument. Accordingly, further embodiments provide a significant technical simplification of pressure control to facilitate collisional cross section measurements.

As described above, in the arrangement of FIG. 6, the gas injection unit is constructed between a turbomolecular pump and a UHV ion gauge. However, it has been recognised that this implementation has the following drawbacks:

Logistically, the turbo pump is supplied with a pre-mounted UHV gauge, where a holistic leak check is performed for the entire assembly. Introducing the gas injection unit into this assembly would be complex, and a holistic leak check would be almost impossible and/or extremely expensive.

Technically, injecting gas into the UHV region is risky, as several components could induce unintentional leaks.

Technically, the injection valve construction is prone to large system-to-system variations which are hard to control in manufacturing.

Serviceability of the instrument may be impacted, as the gas injection unit would limit access to the UHV gauge, pre-amp, and power supplies.

Troubleshooting would be more difficult as the extra unit induces a risk of failures.

Cost-wise, the extra hardware adds significantly to the cost of the overall product.

In embodiments, the turbomolecular pump offers rotational speed control. By reducing the pumping speed to a controlled level, the UHV pressure within the vacuum region in which the mass analyser is located can be adjusted for collisional cross section measurements. The pressure increases due to natural leaks through the ion optics in combination with the reduced pumping speed, but also due to increased backflow from the earlier vacuum stages. The rotational speed can be adjusted very granularly and is stable.

Beneficially, by implementing turbo pump speed control, the energy consumption of the instrument can be optimised for certain applications and a lower power standby mode can be established.

It has been recognised, however, that running the turbo pump at different speeds may excite mechanical resonances. These can be measured by observing side-bands existing next to analytical ion peaks in a mass spectrum, which are created by mechanical vibrations. A calibration procedure can monitor individual resonances and exclude them from the application space. Reducing the speed of the turbomolecular pump has an impact on the required pumping speed(s) for the previous vacuum stages as well, which should be taken into account.

Figure 10A:
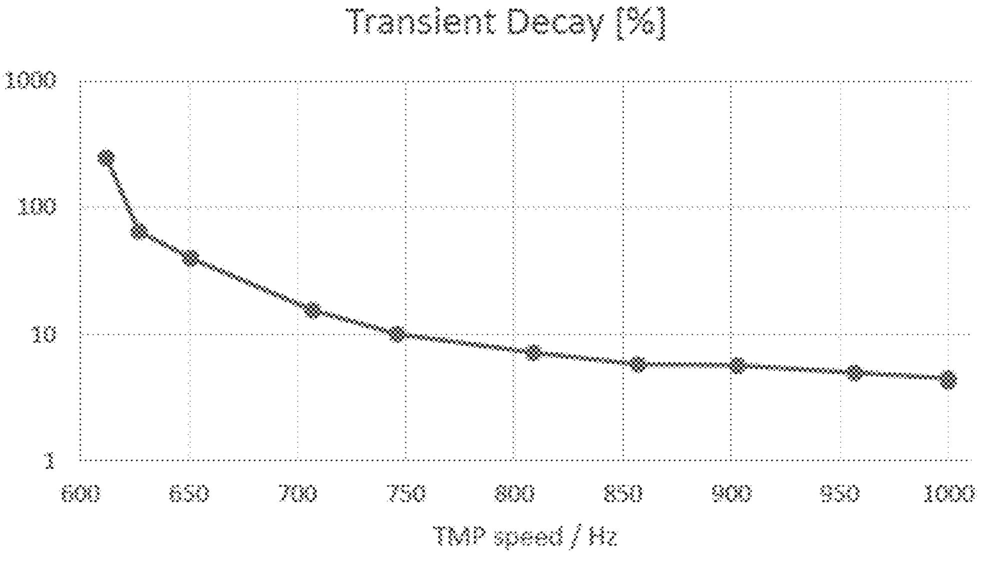
FIG. 10A shows the effect of turbomolecular pumping speed on transient decay rate.
Figure 10B:
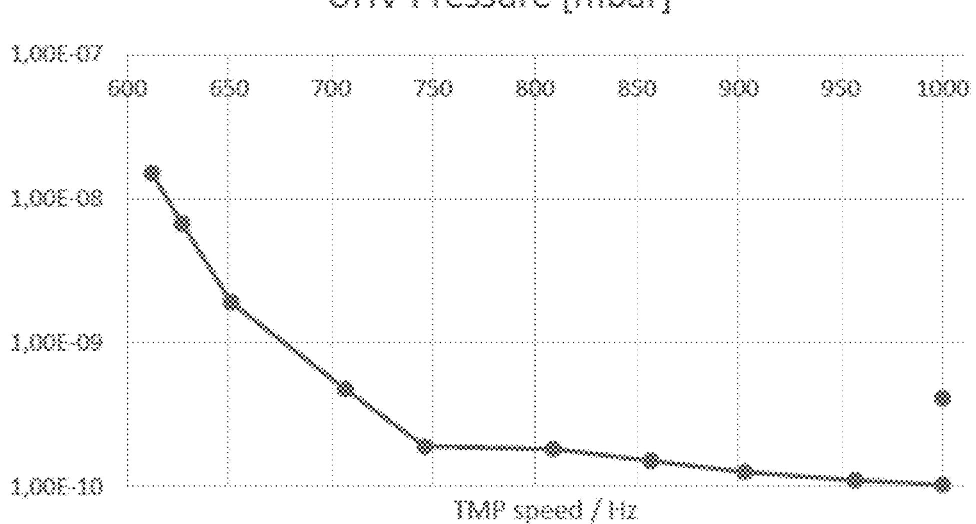
FIG. 10B shows the effect of turbomolecular pumping speed on pressure.

FIG. 10 shows the effect of changing the turbomolecular pump speed on the transient decay rate (FIG. 10A), and on the pressure (FIG. 10B). In FIG. 10A, values >100% indicate that the transient fully decayed below 512 ms. For the CCS measurement method described herein, the required adjustment range is between about $1\times10^{-8}$ mbar and $1\times10^{-9}$ mbar, corresponding to a turbomolecular pump frequency range of about 620 Hz to 680 Hz. In contrast, in the "normal" mass analysis mode of operation, the pressure is controlled to be less than $1\times10^{-9}$ mbar, or less than $3\times10^{-10}$ mbar, corresponding to a turbomolecular pump frequency range greater than about 700 Hz.

Thus, it has been recognised that the highly stable gas load of modern mass spectrometers allows the compression ratio of a turbopump to be used for pressure control in a mass analyser. The compression ratio is controlled by adjusting the rotation speed of the turbopump with a feedback loop utilising direct vacuum readout or transient decay of a calibrant ion (in a corresponding manner to that described above with reference to FIG. 6). It has also been shown that the effect of lowered rotation speed on other parts of the spectrometer is negligible or controllable.

This pressure control may accordingly be used for control of transient decay of different analyte ions with the purpose of determining their collisional cross-sections.

These embodiments allow the additional complex pressure adjustment unit of FIG. 6 to be replaced by a software-controlled approach, at no extra cost for the product.

Furthermore, these embodiments allow optimisation of the instrument power consumption for situations where higher UHV pressures are still compatible with the required performance of the instrument for the analytes of interest (e.g. in specific GC or LC applications).

It will be appreciated that embodiments of the disclosure may be implemented using a variety of different information processing systems. In particular, although the figures and the discussion thereof provide exemplary computing systems and methods, these are presented merely to provide a useful reference in discussing various aspects of the disclosure. Embodiments may be carried out on any suitable data processing device, such as a personal computer, laptop, personal digital assistant, server computer, etc. Of course, the description of the systems and methods has been simplified for purposes of discussion, and they are just one of many different types of systems and methods that may be used. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules. Moreover, multiple method steps implemented in flowcharts contained herein, or as described above, may be implemented together by a single module. Such modules and hardware may be integrated into a mass spectrometry system.

It will be appreciated that, insofar as embodiments of the disclosure are implemented by a computer program, then a storage medium and a transmission medium carrying the computer program form aspects of the disclosure. The computer program may have one or more program instructions, or program code, that, when executed by a computer, causes an embodiment of the disclosure to be carried out. The term "program", as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

This disclosure particularly relates to methods and apparatus for performing Fourier transform mass spectrometry (FTMS). In this disclosure, FTMS refers to mass spectrometry in which ions are caused to perform periodic motion that generates an image current, the frequency of which depends on the m/z of the ions. Mass spectra can be obtained by Fourier transformation of the image current signals, or transients as they often termed. However, other mathematical transformations or deconvolution methods may be used alternatively to Fourier transformation to obtain mass spectra from the image current signals, as known in the art. Examples of FTMS include Fourier transform ion cyclotron resonance and orbital trapping mass spectrometry, the latter of which may be performed using an Orbitrap instrument. FTMS may also be performed generally using electrostatic Kingdon ion traps.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

Moreover, a number of variations to the described embodiments can be made and will be apparent to a skilled reader upon reading this specification. For instance, while orbital traps have been predominantly described, the mass analysers described herein may be any one or more of: an orbital trapping mass analyser; or a Fourier-transform ion cyclotron resonance mass analyser; and/or an electrostatic trap having an open (e.g. utilising only one multi-reflection pass of ions along one of the spatial dimensions) or a closed (e.g. where ions change direction multiple times along all dimensions over the duration of m/z-separation) configuration.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as “a” or “an” (such as an ion or a detection signal) means “one or more” (for instance, one or more ions, or one or more detection signals). Throughout the description and claims of this disclosure, the words “comprise”, “including”, “having” and “contain” and variations of the words, for example “comprising” and “comprises” or similar, mean that the described feature includes the additional features that follow, and are not intended to (and do not) exclude the presence of other components. Moreover, where a first feature is described as being “based on” a second feature, this may mean that the first feature is wholly based on the second feature, or that the first feature is based at least in part on the second feature.

The use of any and all examples, or exemplary language (“for instance”, “such as”, “for example” and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The invention claimed is:

1. A mass spectrometry system for performing mass analysis on an ion sample, comprising:

a vacuum region comprising a mass analyser configured to provide a detection signal for the ion sample;

a turbomolecular pump configured to maintain the vacuum region at a vacuum pressure; and a controller configured to control the pressure within the mass analyser to control the rate of decay over time of the detection signal for the ion sample by: controlling a pumping speed of the turbomolecular pump.

2. The mass spectrometry system of claim 1, wherein:

the controller is configured to operate the turbomolecular pump with one or more first pumping speed(s) when the mass analyser is being operated in a mass analysis mode of operation; and the controller is configured to operate the turbomolecular pump with one or more second pumping speed(s) when the mass analyser is being operated in a collision cross section analysis mode of operation, wherein the second pumping speed(s) is/are less than the first pumping speed(s).

3. The mass spectrometry system of claim 1- or 2, wherein:

the turbomolecular pump is configured to maintain the vacuum region at a first pressure when the mass analyser is being operated in a mass analysis mode of operation; and the turbomolecular pump is configured to maintain the vacuum region at a second pressure when the mass analyser is being operated in a collision cross section analysis mode of operation, wherein the second pressure is greater than the first pressure.

4. The mass spectrometry system of claim 3, wherein either the second pressure is less than $3\times10^{-8}$ mbar ($3\times10^{-6}$ Pa), the first pressure is less than $5\times10^{-9}$ mbar ($5\times10^{-7}$ Pa), or both.

5. The mass spectrometry system of claim 1, wherein the controller is configured to control the pumping speed of the turbomolecular pump so as to control the pressure within the vacuum region based on: the pressure within a first vacuum region; and/or a measure of the rate of decay over time of the detection signal for the ion sample.

6. The mass spectrometry system of claim 5, further comprising a pressure sensor configured to measure the pressure within a first vacuum region and to provide the measured pressure to the controller.

7. A mass spectrometry system comprising:

a mass analyser arranged in a vacuum region pumped by a turbomolecular pump; and a controller configured to perform a method for determining a measure of a rate of decay of an ion sample undergoing mass analysis in the mass analyser with image current detection, the method comprising:

receiving a detection signal for the ion sample from a transient detection of the ion sample obtained using the mass analyser, the detection signal for the ion sample having a rate of decay over time; and determining the measure of the rate of decay of the ion sample based on an extrapolated resolution for the ion sample, the extrapolated resolution being an expected resolution of the detection signal in conditions in which the rate of decay over time of the detection signal for the ion sample is dominated by collisional effects;

wherein the controller is configured to control the pressure within the mass analyser to control the rate of decay over time of the detection signal for the ion sample by: controlling a pumping speed of the turbomolecular pump.

8. The mass spectrometry system of claim 7, wherein the controller is configured to determine the measure of the rate of decay of the ion sample only when one or more conditions are met, the one or more conditions comprising any one or more of: whether a peak of the detection signal is baseline-resolved; a signal-to-noise ratio of the detection signal satisfying a threshold condition; and/or a peak of the detection signal belonging to an isotopic cluster.

9. The mass spectrometry system of claim 7, wherein the extrapolated resolution for the ion sample is an expected resolution of the detection signal in conditions in which the resolution of the detection signal is stable with respect to increasing numbers of sample ions in a sample ion cloud used to generate the detection signal for the ion sample.

10. The mass spectrometry system of claim 7, wherein the controller is configured to determine the extrapolated resolution for the ion sample from an extrapolated function that provides an expected resolution of the detection signal in conditions dominated by collisional effects, the extrapolated function determined based on a plurality of measures of resolution and a plurality of measures of signal intensity that were not obtained in conditions dominated by collisional effects.

11. The mass spectrometry system of claim 10, wherein the extrapolated function is based on a plurality of measures of resolution and a plurality of measures of signal intensity for one or more calibrants.

12. The mass spectrometry system of claim 11, wherein the controller is configured to determine the plurality of measures of resolution for a plurality of different isotopic and charge compositions.

13. The mass spectrometry system of claim 11, wherein the controller is configured to determine the plurality of measures of resolution for a plurality of retention times of an elution profile, preferably wherein the elution profile is a gas chromatography (GC) and/or a liquid chromatography (LC) elution profile.

14. The mass spectrometry system of claim 7 wherein the controller is configured to determine the extrapolated resolution for the ion sample from: a fitted function for a plurality of measures of resolution and a plurality of measures of signal intensity, that provides an expected resolution of the detection signal in conditions dominated by collisional effects; and/or an average resolution, preferably a rolling average or a weighted average, for a plurality of measures of resolution and a plurality of measures of signal intensity, that provides an expected resolution of the detection signal in conditions dominated by collisional effects.

15. The mass spectrometry system of claim 14, wherein the controller is configured to determine the extrapolated resolution for the ion sample from a weighted resolution for a plurality of measures of resolution and a plurality of measures of signal intensity, wherein:

the plurality of measures of resolution comprise one or more relatively high measures of resolution and one or more relatively low measures of resolution; and the one or more relatively high measures of resolution are weighted to provide a greater contribution to the weighted resolution than the one or more relatively low measures of resolution.

16. The mass spectrometry system of claim 15, wherein the weighted resolution is based on resolution for a plurality of isotopic variants of the ion sample.

17. The mass spectrometry system of claim 7, wherein the measure of the rate of decay of the ion sample is a decay constant or a collision cross section.

18. The mass spectrometry system of claim 7, wherein the controller is configured to determine the measure of the rate of decay over time of the detection signal for the ion sample based on a peak width of the detection signal for the ion sample, preferably wherein the determination of the measure of the rate of decay over time of the detection signal for the ion sample takes into account a duration over which the transient detection of the ion sample occurs.

19. The mass spectrometry system of claim 7, wherein the controller is configured to determine a plurality of measures of the rate of decay of the ion sample.

20. The mass spectrometry system of claim 19, wherein the controller is configured to determine a weighted measure of the rate of decay of the ion sample by taking a weighted average of the plurality of measures of the rate of decay of the ion sample.

21. The mass spectrometry system of claim 20, wherein:

the plurality of measures of the rate of decay of the ion sample comprise one or more relatively high measures of intensity of the detection signal for the ion sample and one or more relatively low measures of intensity of the detection signal for the ion sample; and the controller is configured to weight the one or more relatively high measures of intensity of the detection signal for the ion sample to provide a greater contribution to the weighted average than the one or more relatively low measures of intensity of the detection signal for the ion sample.

22. The mass spectrometry system of claim 20, wherein the weighted average excludes one or more measures of the rate of decay of the ion sample for which the measure of intensity of the detection signal for the ion sample are below a threshold value.

23. The mass spectrometry system of claim 20, wherein the weighted average is based on measures of the rate of decay for a plurality of isotopic variants of the ion sample.

24. The mass spectrometry system of claim 19, wherein the controller is configured to determine the plurality of measures of the rate of decay of the ion for a plurality of different isotopic compositions.

25. The mass spectrometry system of claim 19, wherein the controller is configured to determine the plurality of measures of the rate of decay of the ion sample for a plurality of retention times of an elution profile, preferably wherein the elution profile is a gas chromatography (GC) and/or a liquid chromatography (LC) elution profile.

26. A mass spectrometry system comprising:

a mass analyser arranged in a vacuum region pumped by a turbomolecular pump; and a controller configured to perform a method for determining a measure of a rate of decay of an ion sample undergoing mass analysis in the mass analyser with image current detection, the method comprising:

receiving a detection signal for the ion sample from a transient detection of the ion sample obtained using the mass analyser, the detection signal for the ion sample having a rate of decay over time;

determining an adjustment function for the ion sample, based on:

a measure of intensity and/or a measure of mass-to-charge ratio of the detection signal for the ion sample; and a measure of intensity and/or a measure of mass-to-charge ratio of a detection signal previously obtained for a calibrant using the mass analyser; and determining the measure of the rate of decay of the ion sample, by adjusting a measure of the rate of decay over time of the detection signal for the ion sample using the adjustment function;

wherein the controller is configured to control the pressure within the mass analyser to control the rate of decay over time of the detection signal for the ion sample by: controlling a pumping speed of the turbomolecular pump.

27. The mass spectrometry system of claim 26, wherein:

the measure of intensity of the detection signal for the ion sample comprises any one or more of: total ion count; signal amplitude; and/or signal-to-noise ratio; and/or the measure of intensity of the detection signal previously obtained for the calibrant comprises any one or more of: total ion count; signal amplitude; and/or signal-to-noise ratio.

28. The mass spectrometry system of claim 26, wherein:

the measure of mass-to-charge ratio of the detection signal for the ion sample comprises a frequency; and/or the measure of mass-to-charge ratio of the detection signal previously obtained for the calibrant comprises a frequency.

29. The mass spectrometry system of claim 26, wherein:

the detection signal for the ion sample is obtained for an isolated ion sample; or the detection signal for the ion sample is obtained as a full MS scan.

30. The mass spectrometry system of claim 26, wherein the mass analyser is any one or more of: an orbital trapping mass analyser; or a Fourier-transform ion cyclotron resonance mass analyser; and/or an electrostatic trap, and preferably an electrostatic trap having an open configuration or a closed configuration.

31. The mass spectrometry system of claim 26, wherein the controller is configured to use the measure of the rate of decay of the ion sample to: classify the ion sample; and/or to detect interfering species in the ion sample.

32. The mass spectrometry system of claim 26, wherein the adjustment function for the ion sample is based on a measure of intensity of the detection signal for the ion sample and a measure of intensity of a detection signal previously obtained for a calibrant.

33. The mass spectrometry system of claim 26, wherein the adjustment function for the ion sample is based on a ratio between the measure of intensity of the detection signal for the ion sample and the measure of intensity of the detection signal previously obtained for the calibrant.

34. The mass spectrometry system of claim 26, wherein the adjustment function for the ion sample indicates an amount by which to adjust the rate of decay over time of the detection signal for the ion sample, to compensate for error in measuring the rate of decay over time of the detection signal for the ion sample.

35. The mass spectrometry system of claim 26, wherein:

the adjustment function for the ion sample is a scaling factor; and the controller is configured to adjust the measure of the rate of decay over time of the detection signal for the ion sample using the adjustment function by scaling the measure of the rate of decay over time of the detection signal for the ion sample by the scaling factor.

* * * * *